(12) United States Patent
Endo et al.

(10) Patent No.: US 10,562,402 B2
(45) Date of Patent: Feb. 18, 2020

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Takahito Endo, Shizuoka-ken (JP); Hidekazu Nagai, Susono (JP); Kensei Hata, Shizuoka-ken (JP); Akira Murakami, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 286 days.

(21) Appl. No.: 15/631,292

(22) Filed: Jun. 23, 2017

(65) Prior Publication Data
US 2017/0368942 A1   Dec. 28, 2017

(30) Foreign Application Priority Data

Jun. 27, 2016   (JP) ................. 2016-126924

(51) Int. Cl.
| | |
|---|---|
| B60W 20/30 | (2016.01) |
| B60L 50/62 | (2019.01) |
| B60K 6/46 | (2007.10) |
| B60L 15/20 | (2006.01) |
| B60W 20/10 | (2016.01) |

(Continued)

(52) U.S. Cl.
CPC ............... B60L 50/62 (2019.02); B60K 6/46 (2013.01); B60L 15/20 (2013.01); B60W 20/10 (2013.01); B60W 20/30 (2013.01); B60L 2240/12 (2013.01); B60L 2240/421 (2013.01);
(Continued)

(58) Field of Classification Search
CPC ...... B60W 20/30; B60W 20/10; B60W 10/06; B60W 10/08; B60L 11/126; B60L 2240/441; B60L 2240/421; B60L 50/16; B60L 50/61; B60L 15/20; B60L 2260/26; B60L 2240/443; B60L 2240/423; B60L 2240/12; B60K 6/46; Y02T 10/72;
(Continued)

(56) References Cited

U.S. PATENT DOCUMENTS

| | | | |
|---|---|---|---|
| 2010/0081533 A1 | 4/2010 | Lee et al. | |
| 2010/0273601 A1* | 10/2010 | Aota ..................... | F16H 3/66 475/278 |

(Continued)

FOREIGN PATENT DOCUMENTS

| | | |
|---|---|---|
| JP | 2012-046162 A | 3/2012 |
| JP | 2013-193556 A | 9/2013 |

(Continued)

*Primary Examiner* — Genna M Mott
(74) *Attorney, Agent, or Firm* — Hunton Andrews Kurth LLP

(57) ABSTRACT

A control system for a hybrid vehicle that can reduce a power loss resulting from shifting an operating mode from motor mode to hybrid mode is provided. A transmission that is adapted to distribute torque applied to an input element to a reaction element and an output element, and to change a ratio between a first torque delivered to the reaction element and a second torque delivered to the output element. A controller is configured to start an engine in a high mode in which a torque ratio of the output element to the input element is small if the vehicle speed is higher than a threshold value, and to start the engine in a low mode in which the torque ratio is greater if the vehicle speed is lower than the threshold value.

7 Claims, 17 Drawing Sheets

(51) Int. Cl.
*B60W 10/06* (2006.01)
*B60W 10/08* (2006.01)

(52) U.S. Cl.
CPC ........ *B60L 2240/441* (2013.01); *B60W 10/06* (2013.01); *B60W 10/08* (2013.01)

(58) Field of Classification Search
CPC ............. Y02T 10/6217; Y02T 10/7275; Y02T 10/645; Y02T 10/7077
See application file for complete search history.

(56) References Cited

U.S. PATENT DOCUMENTS

| | | | |
|---|---|---|---|
| 2011/0053735 A1* | 3/2011 | Lewis | F02N 11/0803 |
| | | | 477/99 |
| 2012/0006153 A1* | 1/2012 | Imamura | B60K 6/442 |
| | | | 74/665 A |
| 2012/0052999 A1 | 3/2012 | Kim et al. | |
| 2015/0072819 A1 | 3/2015 | Ono et al. | |
| 2015/0224983 A1 | 8/2015 | Hiasa et al. | |
| 2015/0321658 A1* | 11/2015 | Hansson | B60K 6/48 |
| | | | 701/22 |
| 2017/0217302 A1 | 8/2017 | Imamura et al. | |
| 2017/0259809 A1 | 9/2017 | Sakamoto | |
| 2017/0355359 A1* | 12/2017 | Tsukada | B60K 6/365 |

FOREIGN PATENT DOCUMENTS

| | | |
|---|---|---|
| JP | 2014-051146 A | 3/2014 |
| JP | 2016-037105 A | 3/2016 |
| JP | 2016-055759 A | 4/2016 |
| WO | 2013-114595 A1 | 8/2013 |
| WO | 2014-041698 A1 | 3/2014 |

* cited by examiner

| Operating Mode | CL1, CL11, CL13 | CL2, CL21, CL23 | BK |
|---|---|---|---|
| HV·High | O | – | – |
| HV·Low | – | O | – |
| HV·Direct | O | O | – |
| EV·Disconnecting | – | – | –(O) |
| EV(Dual-Motor)·High | O | – | O |
| EV(Dual-Motor)·Low | – | O | O |
| (Locking) | O | O | O |

O : Engagement  – : Disengagement

| Operating Mode | CL12 | CL22 | BK |
|---|---|---|---|
| HV・Low | O | - | - |
| HV・High | - | O | - |
| HV・Direct | O | O | - |
| EV・Disconnecting | - | - | -(O) |
| EV(Dual-Motor)・Low | O | - | O |
| EV(Dual-Motor)・High | - | O | O |

O:Engagement  -:Disengagement

| Operating Mode | CL14 | CL24 |
|---|---|---|
| HV·High & Direct | ◯ | – |
| HV·Low & Direct | – | ◯ |
| EV(Dual-Motor) | ◯ | ◯ |
| EV·Disconnecting | – | – |

◯:Engagement –:Disengagement

| Operating Mode | CL15 | CL25 |
|---|---|---|
| HV·Low & Direct | ○ | – |
| HV·High & Direct | – | ○ |
| EV(Dual-Motor) | ○ | ○ |
| EV·Disconnecting | – | – |

○:Engagement  –:Disengagement

CONTROL SYSTEM FOR HYBRID VEHICLE

CROSS REFERENCE TO RELATED APPLICATIONS

The present invention claims the benefit of priority to Japanese Patent Application No. 2016-126924 filed on Jun. 27, 2016 with the Japanese Patent Office.

BACKGROUND

Field of the Invention

Embodiments of the present invention relate to a control system for a hybrid vehicle in which a prime mover includes an engine and a motor.

Discussion of the Related Art

JP-A-2014-51146 describes one example of a hybrid vehicle having an engine, a first motor and a second motor. In the hybrid vehicle taught by JP-A-2014-51146, power of the engine is distributed to the first motor and a driveshaft through a first single-pinion planetary gear unit serving as a power distribution device. Electricity generated by the first motor is supplied to the second motor so that power of the second motor is added to the driveshaft. A second single-pinion planetary gear unit is disposed between the first single-pinion planetary gear unit and the driveshaft to serve as a transmission. According to the teachings of JP-A-2014-51146, a first carrier of the first planetary gear unit is connected to the engine, a first sun gear of the first planetary gear unit is connected to the first motor, a first ring gear of the first planetary gear unit is connected to a second career of the second planetary gear unit, and a second ring gear of the second planetary gear unit and the second motor are connected to the driveshaft through a counter gear and a differential gear. The second planetary gear unit is integrated by connecting the second career to a second sun gear of the second planetary gear unit by a clutch, and a rotation of the sun gear is selectively stopped by a brake.

In the hybrid vehicle described in JP-A-2014-51146, an output element of the power distribution device is connected to the transmission adapted to shift a gear stage between a high stage and a low stage so that a drive torque delivered to the driveshaft or an output speed is changed depending on the gear stage. According to the teachings of JP-A-2014-51146, the engine is started in the high stage to suppress fluctuation in the drive force. However, if the engine is started in the high stage at a low speed, an electrical loss may be increased. That is, in the high stage, torque is transmitted through the transmission setting the high stage. Consequently, engine torque delivered to the driveshaft through a mechanical means such as a gear unit may be reduced, but torque temporarily converted into electricity and then delivered to the driveshaft from the motor may be increased. Thus, the power delivered to the driveshaft while being converted temporarily into electric power is increased and hence the electrical loss resulting from such power conversion is increased. Such electrical loss is larger than a mechanical loss. For this reason, energy efficiency in the hybrid vehicle may decrease if the engine is started in the high stage.

SUMMARY

Aspects of the present invention have been conceived noting the foregoing technical problems, and it is therefore an object of the present application is to provide a control system for a hybrid vehicle that can reduce a loss resulting from shifting an operating mode from electric vehicle mode in which an engine is stopped to hybrid mode in which the engine is activated.

The control system according to the present disclosure is applied to a hybrid vehicle comprising: a transmission that is adapted to perform a differential action at least among an input element, a reaction element and an output element while distributing torque applied to the input element to the reaction element and the output element, and to change a ratio between a first torque delivered to the reaction element and a second torque delivered to the output element; an engine that is connected to the input element; a first motor having a generating function that is connected to the reaction element; a second motor that applies torque to an output unit connected to the output element; and a controller that controls the engine, the first motor, the second motor, and the transmission. In the hybrid vehicle, an operating mode can be selected from a hybrid mode in which the vehicle is powered by the engine, and an electric vehicle mode in which the vehicle is powered at least by the second motor. in order to achieve the above-explained objective, according to the embodiment of the present disclosure, the controller is configured to: detect a speed of the vehicle; start the engine in a high mode in which a torque ratio of the output element to the input element is a predetermined value to shift the operating mode from the electric vehicle mode to the hybrid mode, if the vehicle speed is higher than a predetermined threshold value; and start the engine in a low mode in which said torque ratio is greater than that in the high mode to shift the operating mode from the electric vehicle mode to the hybrid mode, if the vehicle speed is lower than the threshold value.

In a non-limiting embodiment, the threshold value of the vehicle speed may be set between: a first vehicle speed at a point when the first motor serving as a generator starts serving as a motor in the process of starting the engine in the high mode; and a second vehicle speed at a point when the first motor serving as a generator starts serving as a motor in the process of starting the engine in the low mode.

In a non-limiting embodiment, the controller may be further configured to: calculate a required driving force of the vehicle; and start the engine in the high mode if the vehicle speed is lower than the threshold value, and the required driving force is smaller than a predetermined threshold value.

In a non-limiting embodiment, the threshold value of the driving force may be increased with an increase in the vehicle speed.

In a non-limiting embodiment, the controller may be further configured to: detect at least any one of an atmospheric temperature and a temperature of the engine; and start the engine in the low mode if the detected temperature is lower than a predetermined threshold value.

In a non-limiting embodiment, the transmission may include: a first planetary gear unit adapted to perform a differential action among a first input element, a first reaction element and a first output element; a second planetary gear unit adapted to perform a differential action among a second input element, a second reaction element and a second output element; a first engagement device that selectively connects the first input element to the second reaction element; and a second engagement device that selectively connects any two of rotary elements to rotate the second planetary gear unit integrally. In the transmission, the first input element may be connected to the engine, the first reaction element may be connected to the first motor, the first output element may be connected to the second input element, and the second output element may be connected to the output unit.

In a non-limiting embodiment, the transmission may include: a first planetary gear unit adapted to perform a differential action among a first input element, a first reaction element and a first output element; a second planetary gear unit adapted to perform a differential action among a second input element, a second reaction element and a second output element; a first engagement device that selectively connects the first input element to the second reaction element; and a second engagement device that selectively stops a rotation of the second reaction element. In the transmission, the first input element may be connected to the engine, the first reaction element may be connected to the first motor, the first output element may be connected to the second input element, and the second output element may be connected to the output unit.

In a non-limiting embodiment, the control system may further comprise a third engagement device that selectively stops a rotation of the first input element connected to the engine, and the controller may be further configured to control the third engagement device.

Thus, according to the embodiment of the present disclosure, the engine is started in the high mode if the vehicle speed is higher than the threshold value during propulsion in the electric vehicle mode, and the engine is started in the low mode if the vehicle speed is lower than the threshold value during propulsion in the electric vehicle mode. In the low mode, the torque ratio of the output element to the input element is larger than that in the high mode. That is, when the vehicle is propelled by the motor(s) at a high speed, output torque of the first motor may be reduced to start the engine in the high mode. According to the embodiment of the present disclosure, therefore, occurrence of power circulation may be avoided to reduce an electrical loss resulting from starting the engine. By contrast, during propulsion in the low mode at a low speed, a percentage of the torque delivered directly from the engine to the output unit without passing through the reaction element such as the first motor is increased, and consequently the torque delivered to the output unit through the second motor while being temporarily converted into an electric power by the first motor is reduced. For this reason, a power loss may be reduced in the hybrid vehicle.

As described, the threshold value of the vehicle speed is set between: the first vehicle speed at a point when the first motor serving as a generator starts serving as a motor in the process of starting the engine in the high mode; and the second vehicle speed at a point when the first motor serving as a generator starts serving as a motor in the process of starting the engine in the low mode. Given that the threshold value of the vehicle speed is set outside of the range between the first vehicle speed and the second vehicle speed, and that the operating mode is shifted between the high mode and the low mode based on such threshold value, an electrical loss resulting from starting the engine may not be reduced sufficiently. According to the embodiment of the present disclosure, therefore, the engine may be started while reducing a power loss depending on a travelling condition.

Further, according to the embodiment of the present disclosure, the engine is started in the high mode if the required driving force is smaller than the threshold value, even if the vehicle speed is lower than the threshold value. According to the embodiment of the present disclosure, therefore, a difference between rotational speeds of the first motor before and after starting the engine can be reduced. For this reason, a power loss resulting from starting the engine can be reduced.

In addition, if the detected temperature is low, startup of the engine in the high mode is inhibited and the engine is started in the low mode. According to the embodiment of the present disclosure, therefore, the engine can be started by the amplified torque of the first motor so that the engine can be started easily even if the temperature is low.

According to the embodiment of the present disclosure, the first planetary gear serving as a power distribution device, the second planetary gear unit, the first engagement device and the second engagement device form a complex planetary gear unit. According to the embodiment of the present disclosure, therefore, the transmission may also serve as a power distribution device.

Further, a rotation of the first input element connected to the engine can be stopped by the third engagement device to deliver the torque of the first motor to the output unit. According to the embodiment of the present disclosure, therefore, the vehicle can be powered by both of the first motor and the second motor in dual motor mode.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

Figure 1:
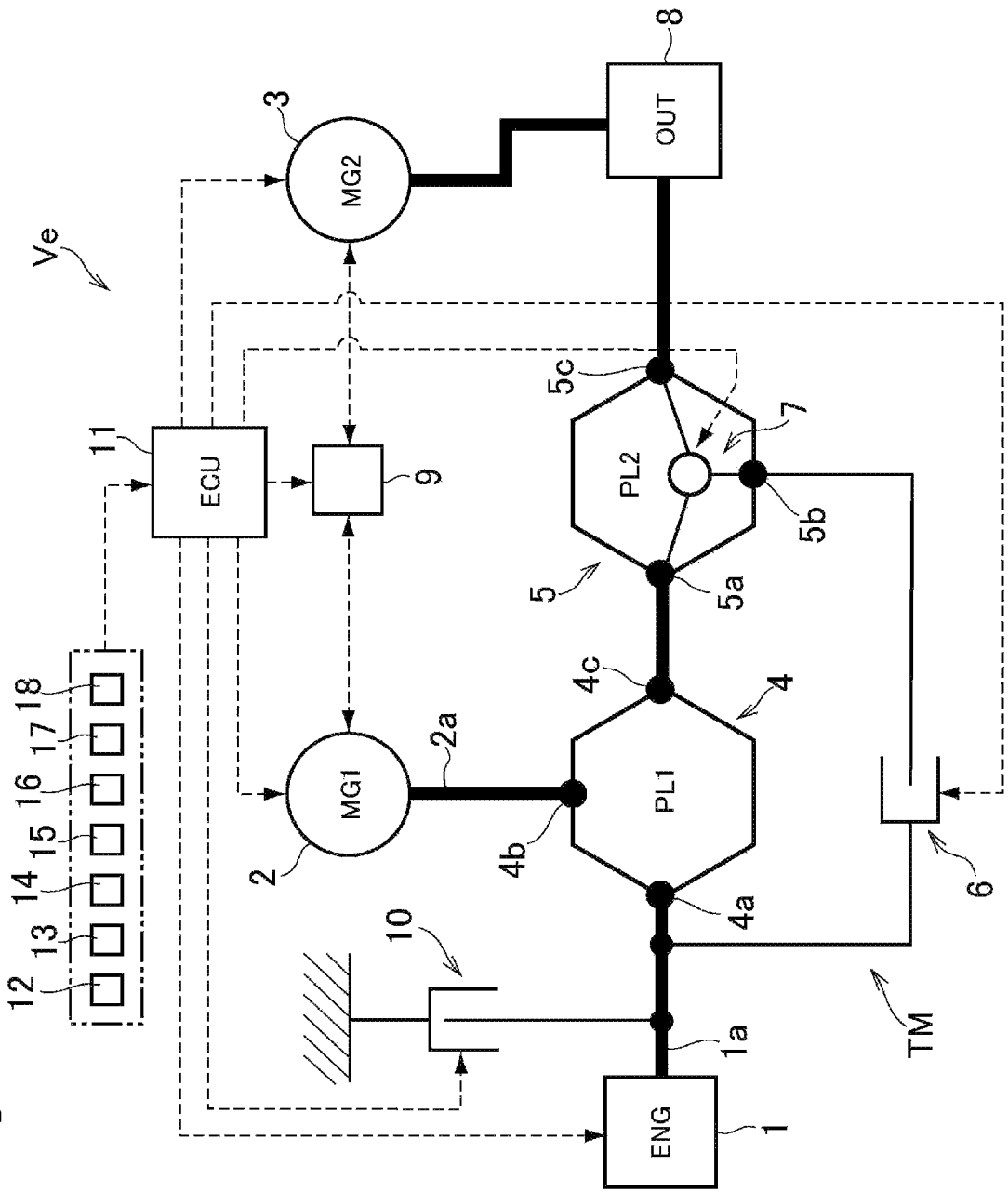
FIG. 1 is a block diagram showing one example of a drive system of the hybrid vehicle to which the control system according to the present disclosure is applied.

Preferred embodiments of the present application will now be explained with reference to the accompanying drawings. Referring now to FIG. 1, there is shown one example of a drive system of a hybrid vehicle to which the control system according to the present disclosure is applied. A prime mover of the vehicle Ve shown in FIG. 1 includes an engine (referred to as "ENG" in FIG. 1) 1, a first motor (referred to as "MG1" in FIG. 1) 2, and a second motor (referred to as "MG2" in FIG. 1) 3. A power train of the vehicle Ve includes a first planetary gear unit (referred to as "PL1" in FIG. 1) 4, a second planetary gear unit (referred to as "PL2" in FIG. 1) 5, a first engagement device 6, a second engagement device 7 and an output unit 8 (referred to as "OUT" in FIG. 1).

Power of the engine 1 is distributed to the first motor 2 side and to the output unit 8 side through the first planetary gear unit 4 serving as a power distribution device. The first motor 2 and the second motor 3 are individually connected to an electric power source 9 comprising a battery and an inverter or a converter (neither of which are shown) so that speeds and torques of the first motor 2 and the second motor 3 are controlled electrically. In addition, the first motor 2 and the second motor 3 may selectively serve as motors and generators by controlling currents supplied thereto. Specifically, the second motor 3 may be operated as a motor by supplying electricity generated by the first motor 2, and an output power of the second motor 3 may be applied to the output unit 8.

The first planetary gear unit 4 is adapted to perform a differential action among a first input element 4a, a first reaction element 4b and a first output element 4c. Specifically, the first input element 4a is connected to an output shaft 1a of the engine 1, the first reaction element 4b is connected to an output shaft 2a of the first motor 2, and the first output element 4c is connected to a second input element 5a of the second planetary gear unit 5. The second planetary gear unit 5 is disposed on a downstream side of the first planetary gear unit 4 so that the engine torque is delivered to the second planetary gear unit 5 via the first planetary gear unit 4.

The second planetary gear unit 5 is also adapted to perform a differential action among a second input element 5a, a second reaction element 5b and a second output element 5c. Specifically, the second input element 5a is connected to the first output element 4c of the first planetary gear unit 4, the second reaction element 5b is connected to the first input element 4a of the first planetary gear unit 4 through the first engagement device 6, and the second output element 5c is connected to the output unit 8 that is connected to drive wheels (not shown) to transmit power thereto.

The first engagement device 6 is a clutch adapted to selectively connect two rotary elements. In the vehicle Ve, specifically, the first input element 4a of the first planetary gear unit 4 and the second reaction element 5b of the second planetary gear unit 5 are connected to each other to be rotated integrally by applying the first engagement device 6.

The second engagement device 7 is also a clutch adapted to selectively connect at least any of two rotary elements in the second planetary gear unit 5 to rotate all of the rotary elements of the second planetary gear unit 5 integrally.

Thus, the first output element 4c of the first planetary gear unit 4 and the second input element 5a of the second planetary gear unit 5 are connected to each other, and the first input element 4a of the first planetary gear unit 4 and the second reaction element 5b of the second planetary gear unit 5 are selectively connected to each other by the first engagement device 6. That is, the first planetary gear unit 4 and the second planetary gear unit 5 serve as a complex planetary gear unit.

The complex planetary gear unit is selectively allowed to perform a differential action by changing engagement states of the first engagement device 6 and the second engagement device 7, and a speed ratio between any of two rotary elements in the complex planetary gear unit is also changed by changing engagement states of the first engagement device 6 and the second engagement device 7. Thus, a transmission TM includes the first planetary gear unit 4, the second planetary gear unit 5, the first engagement device 6 and the second engagement device 7. In the vehicle Ve, therefore, torque of the engine 1 and torque of the first motor 2 (i.e., a first motor torque) can be delivered to the output unit 8 while changing two different speed ratios. In the transmission TM, specifically, torque applied to the input element of the complex planetary gear unit is distributed to the reaction element and the output element, and a ratio between the torque delivered to the reaction element (i.e., a first torque) and the torque delivered to the output element (i.e., a second torque) may be changed arbitrarily.

A rotation of the output shaft 1a of the engine 1 connected to the first input element 4a of the first planetary gear unit 4 may be stopped selectively by a third engagement device 10. In the vehicle Ve, therefore, the first input element 4a of the first planetary gear unit 4 is allowed to serve as a reaction element of the first planetary gear unit 4 to deliver the first motor torque to the output unit 8 by applying the third engagement device 10. In this case, the vehicle Ve may be powered by the first motor 2 and the second motor 3 efficiently while stopping the engine 1.

In order to control the engine 1, the first motor 2, the second motor 3, the first engagement device 6, the second engagement device 7, the third engagement device 10 and the power source 9, the vehicle Ve is further provided with a controller (referred to as "ECU" in FIG. 1) 11 composed mainly of a microcomputer.

For example, detection signals from a vehicle speed sensor 12 that detects a speed of the vehicle Ve, an accelerator sensor 13 that detects a position or an angle of an accelerator pedal, an engine speed sensor 14 that detects a speed of the engine 1, a first motor speed sensor (or a resolver) 15 that detects a speed of the first motor 2, a second motor speed sensor (or a resolver) 16 that detects a speed of the second motor 3, a temperature sensor 17 that detects an atmospheric temperature around the vehicle Ve or a temperature of the engine 1, and an oil temperature sensor 18 that detects a temperature of lubrication oil for the engine 1 are sent to the controller 11.

The controller 11 is configured to carry out a calculation based on incident data and data and formulas installed in advance, and to transmit calculation results in the form of command signals to the above-mentioned elements.

Figure 2:
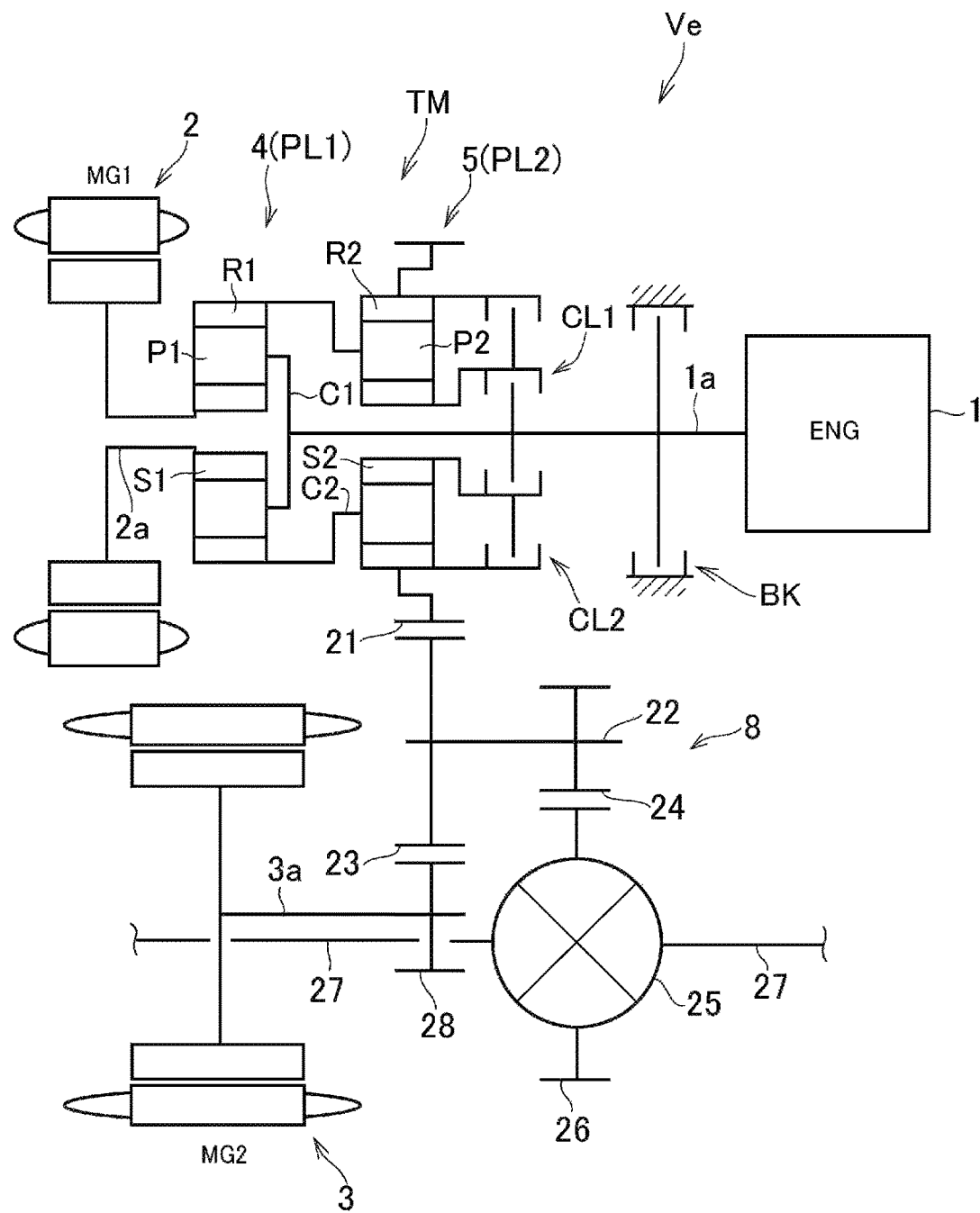
FIG. 2 is a schematic illustration showing a first example of a gear train of the hybrid vehicle shown in FIG. 1.

Turning to FIG. 2, there is shown a first example of a gear train of the vehicle Ve. The gear train shown in FIG. 2 is adapted to be used as a transaxle in FF (front-engine/front-wheel drive) layout vehicles, RR (rear engine/rear wheel drive) layout vehicles, and MR (mid-engine/rear drive) layout vehicles.

For example, a gasoline engine and a diesel engine may be used as the engine (referred to as "ENG" in FIG. 2) 1. In the vehicle Ve, the engine 1 is started and stopped electrically, and output power thereof is also adjusted electrically. Specifically, given that a gasoline engine is used as the engine 1, an opening degree of a throttle valve, an amount of fuel supply, a commencement and a termination of ignition, an ignition timing etc. are controlled electrically.

Each of the first motor (referred to as "MG1" in FIG. 2) 2 and the second motor (referred to as "MG2" in FIG. 2) 3 is a motor-generator having a generating function. For example, a permanent magnet synchronous motor and an induction motor are especially suitable to use as the first motor 2 and the second motor 3. As described, the first motor 2 and the second motor 3 are electrically connected to each other so that the second motor 3 is driven by supplying electricity generated by the first motor 2. Output torque of the second motor 3 (i.e., a second motor torque) is delivered to the output unit 8 to propel the vehicle Ve.

The first planetary gear unit (referred to as "PL1" in FIG. 2) 4 is a single-pinion planetary gear unit comprising a sun gear S1, a ring gear R1, and a carrier C1. In the first planetary gear unit 4, specifically, the sun gear S1 as an external gear is arranged coaxially with the output shaft 1a of the engine 1, the ring gear R1 as an internal gear is arranged coaxially around the sun gear S1, and the carrier C1 holds a plurality of pinion gears P1 interposed between the sun gear S1 and the ring gear R1 in a rotatable manner.

The second planetary gear unit (referred to as "PL2" in FIG. 2) 5 is also a single-pinion planetary gear unit comprising a sun gear S2, a ring gear R2, and a carrier C2. In the second planetary gear unit 5, specifically, the sun gear S1 as an external gear is fitted onto the output shaft 1a of the engine 1, the ring gear R2 as an internal gear is arranged coaxially around the sun gear S2, and the carrier C2 holds a plurality of pinion gears P2 interposed between the sun gear S2 and the ring gear R2 in a rotatable manner.

In the first planetary gear unit 4, the carrier C1 is connected to the output shaft 1a of the engine 1, the sun gear S1 is connected to the output shaft 2a of the first motor 2, and the ring gear R1 is connected to the carrier C2 of the second planetary gear unit 5. The ring gear R2 of the second planetary gear unit 5 is connected to the output unit 8. The output unit 8 comprises a drive gear 21, a countershaft 22, a counter driven gear 23, and a final drive gear 24, and an output torque of the output unit 8 is delivered to a driveshaft 27 through a differential 25.

Optionally, a gear unit may be interposed between the carrier C1 of the first planetary gear unit 4 and the output shaft 1a of the engine 1. Instead, a damper device or a torque converter (neither of which are shown) may also be interposed between the carrier C1 of the first planetary gear unit 4 and the output shaft 1a of the engine 1.

The carrier C1 is selectively connected to the sun gear S2 by a first clutch CL1, and any two of the rotary elements of the second planetary gear unit 5 are connected to each other by a second clutch CL2. In the vehicle Ve shown in FIG. 2, specifically, the sun gear S2 is selectively connected to the ring gear R2 by the second clutch CL2. For example, a friction clutch such as a wet-type multiple disc, and a dog clutch may be used as the first clutch CL1 and the second clutch CL2.

The carrier C1 serves as an input element of the first planetary gear unit 4 to which an engine torque is applied, and a rotation of the carrier C1 is selectively stopped by a brake BK. Specifically, the brake BK is engaged to stop a rotation of the output shaft 1a of the engine 1 while operating the first motor 2 as a motor and stopping the engine 1 so that the carrier C1 is allowed to establish a reaction force. In this situation, a reaction force resulting from rotating the first motor 2 in a counter direction is received by a predetermined stationary member such as a casing to which the brake BK is attached. Consequently, the vehicle Ve is powered by the first motor 2 while stopping the engine 1. Instead, the vehicle Ve may also be powered by the second motor 3 together with the first motor 2 in dual-motor mode of EV mode. In the dual-motor mode, specifically, the first motor 2 is rotated in the counter direction and hence a counter torque is applied to the carrier C1. In this situation, however, the brake BK is in engagement to stop the rotation of the carrier C1 so that the first motor torque is applied to the ring gear R1 to rotate the ring gear R1 in the forward direction (i.e., in a rotational direction of the engine 1). In the dual-motor mode, therefore, the torque thus applied to the ring gear R1 is further distributed to the output unit 8 by engaging at least any one of the first clutch CL1 and the second clutch CL2, and the vehicle Ve is propelled by the output torque of the output unit 8 and the second motor torque.

Thus, the first motor 2 may be used as a prime mover utilizing the brake BK so that the operating mode of the vehicle Ve may be diversified. For this reason, the operating mode may be selected appropriately depending on a traveling condition so as to improve an energy efficiency and drivability.

For example, a friction clutch such as a wet-type multiple disc, and a dog clutch may also be used as the brake BK. In addition, a one-way clutch may also be used as the brake BK to stop the counter rotation of the carrier C1 (i.e., in the opposite direction to the rotational direction of the engine 1).

In the first planetary gear unit 4 shown in FIG. 2, accordingly, the carrier C1 serves as the first input element 4a, the sun gear S1 serves as the first reaction element 4b, and the ring gear R1 serves as the first output element 4c. On the other hand, in the second planetary gear unit 5, the carrier C2 serves as the second input element 5a, the sun gear S2 serves as the second reaction element 5b, and the ring gear R2 serves as the second output element 5c. Further, the first clutch CL1 serves as the first engagement device 6, the second clutch CL2 serves as the second engagement device 7 and the brake BK serves as the third engagement device 10.

As described, the rotary elements of the first planetary gear unit 4 and the second planetary gear unit 5 are connected to each other to form a complex planetary gear unit. Specifically, the carrier C1 of the first planetary gear unit 4 and the sun gear S2 of the second planetary gear unit 5 are connected to each other by applying the first clutch CL1 to serve as an input element of the complex planetary gear unit. Further, in the complex planetary gear unit, the sun gear S1 of the first planetary gear unit 4 serves as a reaction element, and the ring gear R2 of the second planetary gear unit 5 serves as an output element.

As also described, in the complex planetary gear unit, the input element is connected to the engine 1 by applying the first clutch CL1, the reaction element is connected to the first motor 2, and the output element is connected to the output unit 8. In the gear train shown in FIG. 2, therefore, the complex planetary gear unit is selectively allowed to perform a differential action by changing engagement states of the first clutch CL1 and the second clutch CL2, and a speed ratio between any of two rotary elements in the complex planetary gear unit is also changed by changing engagement states of the first clutch CL1 and the second clutch CL2. Thus, in the gear train shown in FIG. 2, the transmission TM includes the first planetary gear unit 4, the second planetary gear unit 5, the first engagement device 6 and the second engagement device 7. In the transmission TM, torque of the engine 1 applied to the input element of the complex planetary gear unit is distributed to the reaction element and the output element, and a ratio between the torque delivered to the reaction element (i.e., the first torque) and the torque delivered to the output element (i.e., the second torque) may be changed arbitrarily.

The drive gear 21 is an external gear that is formed around the ring gear R2 of the second planetary gear unit 5 integrally therewith, and a countershaft 22 is arranged in parallel with a common rotational axis of the output shaft 1a of the engine 1 and the output shaft 2a of the first motor 2. A counter driven gear 23 is fitted onto one of end portions of the countershaft 22 (i.e., in the left side in FIG. 2) while being meshed with the drive gear 21, and a final drive gear 24 is fitted onto the other end portion of the countershaft 22 (i.e., in the right side in FIG. 2) while being meshed with a final driven gear (i.e., a differential ring gear) 26 of the differential 25 a final reduction. Thus, the drive gear 21, the countershaft 22, the counter driven gear 23, and the final drive gear 24 form the output unit 8, and the ring gear R2 of the second planetary gear unit 5 is connected to the drive wheels (not shown) through the output unit 8, the differential 25, and the driveshaft 27.

Torque of the second motor 3 can be added to torque transmitted from the second planetary gear unit 5 to the driveshaft 27. To this end, an output shaft 3a of the second motor 3 is arranged parallel to the countershaft 22, and a pinion 28 is fitted onto a leading end (i.e., in the right side in FIG. 2) while being meshed with the counter driven gear 23. Thus, the second motor 3 is also connected to the drive wheels (not shown) through the output unit 8, the differential 25, and the driveshaft 27.

An operating mode the vehicle Ve shown in FIG. 2 may be selected from a plurality of modes by manipulating the clutches CL1 and CL2, the brake BK, the engine 1 and the motors 2 and 3 by the controller 11. Engagement states of the clutches CL1 and CL2 and the brake BK are indicated in the table shown in FIG. 3. In hybrid mode (to be abbreviated as the "HV mode" hereinafter), the vehicle Ve is powered at least by the engine 1. In the HV mode, specifically, the vehicle Ve is powered not only by the engine 1 but also by at least one of the first motor 2 and the second motor 3. In electric vehicle mode, (to be abbreviated as the "EV mode" hereinafter), the vehicle Ve is powered at least one of the first motor 2 and the second motor 3 while stopping the engine 1. In the EV mode, for example, the vehicle Ve may also be powered by both of the first motor 2 and the second motor 3, or only by the second motor 3.

The HV mode may be shifted among high mode, low mode and direct drive mode by manipulating the clutches CL1 and CL2 and the brake BK. Specifically, the high mode is established by engaging only the first clutch CL1. As described, the first planetary gear unit 4 as a power distribution device is connected to the second planetary gear unit 5 to serve as the complex planetary gear unit by engaging the first clutch CL1 to connect the carrier C1 of the first planetary gear unit 4 to the sun gear S2 of the second planetary gear unit 5. In the HV mode, the engine torque is applied to the carrier C1 of the first planetary gear unit 4 and the sun gear S2 of the second planetary gear unit 5. The torque applied to the carrier C1 of the first planetary gear unit 4 is further distributed to the sun gear S1 and the ring gear R1. Consequently, the first motor 2 is driven as a generator by the torque delivered to the sun gear S1, and a counter torque (in the opposite direction to the rotational direction of the engine 1) is applied to the sun gear S2. Meanwhile, the torque applied to the ring gear R1 of the first planetary gear unit 4 is further distributed to the carrier C2 of the second planetary gear unit 5, and a total torque of the torque distributed to the carrier C2 and the torque applied to the sun gear S2 is applied to the ring gear R2. The torque thus applied to the ring gear R2 is further delivered to the driveshaft 27 through the output unit 8 and the differential 25.

In this situation, the second motor 3 is operated as a motor by supplying the electricity generated by the first motor 2, and the torque of the second motor 3 is also delivered to the driveshaft 27 through the output unit 8 and the differential 25. Thus, the power temporarily converted into an electric power is converted into a mechanical power again by the second motor 3 to be added to the power delivered from the output unit 8.

The low mode is established by engaging the second clutch CL2 while disengaging the first clutch CL1. In the low mode, only the ring gear R1 of the first planetary gear unit 4 and the carrier C2 of the second planetary gear unit 5 are connected to each other. In the low mode, therefore, the engine torque distributed to the ring gear R1 is further delivered to the carrier C2. Since the second clutch CL2 is engaged to connect the sun gear S2 to the ring gear R2, the second planetary gear unit 5 is rotated integrally. In the low mode, therefore, the torque distributed to the ring gear R1 of the first planetary gear unit 4 is delivered to the output unit 8 without being changed, and further delivered to the driveshaft 27 through the differential 25.

Meanwhile, the second motor 3 is operated as a motor by supplying the electricity generated by the first motor 2, and the torque of the first motor 2 is also delivered to the driveshaft 27 through the output unit 8 and the differential 25. That is, the power temporarily converted into an electric power is converted into a mechanical power again by the second motor 3 to be added to the power delivered from the output unit 8.

The direct drive mode is established by engaging both of the first clutch CL1 and the second clutch CL2. As described, the second planetary gear unit 5 is rotated integrally by engaging the second clutch CL2, and the sun gear S2 of the second planetary gear unit 5 is connected to the engine 1 by engaging the first clutch CL1. In the direct drive mode, therefore, the engine torque is delivered directly to the output unit 8 through the second planetary gear unit 5. On the other hand, in the first planetary gear unit 4, the carrier C1 is connected to the engine 1, and the ring gear R1 is connected to the engine 1 through the second planetary gear unit 5 and the first clutch CL1. In the direct drive mode, therefore, the first planetary gear unit 4 is rotated integrally without performing a differential action. Consequently, output torque of the first motor 1 operated as a motor is also delivered to the output unit 8 through the first planetary gear unit 4 and the second planetary gear unit 5 without being increased and decreased. Thus, in the direct drive mode, output powers of the engine 1 and the first motor 2 are delivered to the output unit 8. That is, a largest driving force can be generated in the direct drive mode utilizing both chemical energy as a fuel and electric energy supplied from the power source 9. In other words, the electric power of the power source 9 can be utilized efficiently to propel the vehicle Ve. Especially, since both of the first planetary gear unit 4 and the second planetary gear unit 5 are rotated without causing a relative rotation among the rotary elements, an energy loss can be reduced to improve the energy efficiency.

The high mode and the low mode may also be established in the dual-motor mode of the EV mode in which the engine 1 is stopped. In the dual-motor mode of the EV mode, specifically, the high mode is established by engaging the first clutch CL1 and the brake BK while disengaging the second clutch CL2, and the low mode is established by disengaging the first clutch CL1 while engaging the second clutch CL2 and the brake BK.

Figures 3, 4:
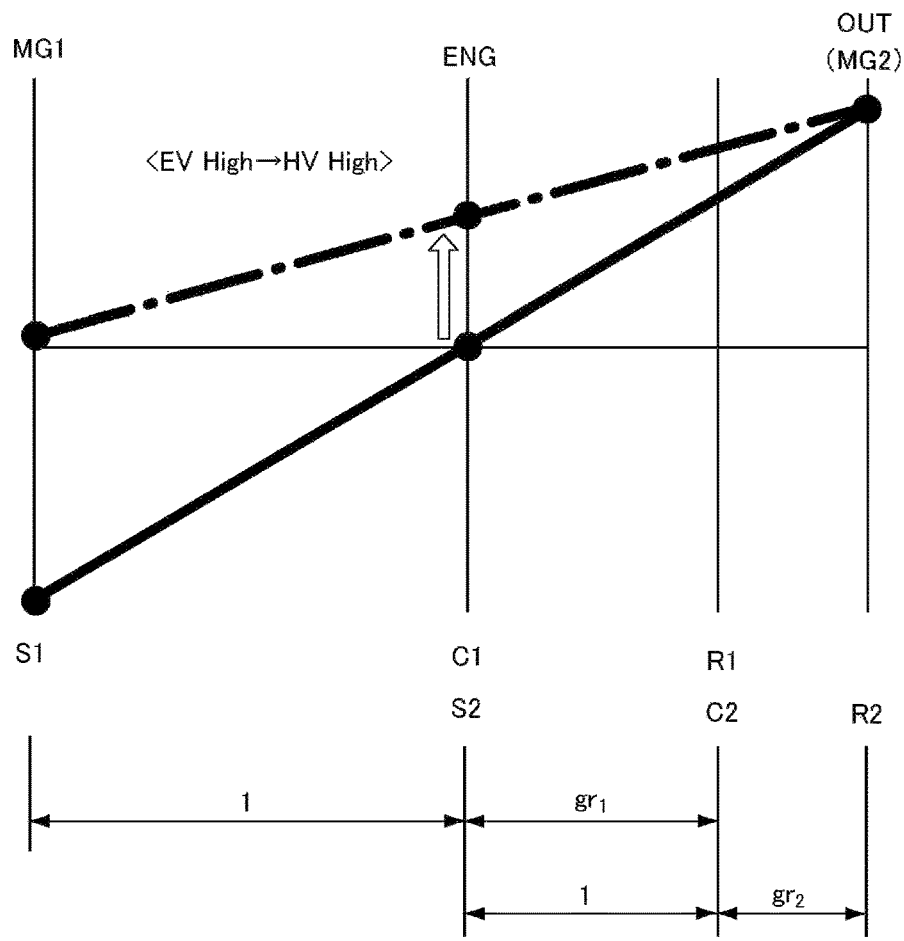
FIG. 3 is a table showing engagement states of engagement devices in the gear train shown in FIG. 2 in each operating mode.
FIG. 4 is a nomographic diagram showing a situation of the hybrid vehicle having the gear train shown in FIG. 2 in the high mode.

Rotational speeds of the rotary elements of the complex planetary gear unit in the high modes are indicated in a nomographic diagram shown in FIG. 4. In FIG. 4, specifically, each clearance between vertical lines representing rotary elements individually indicates a gear ratio between the rotary elements, and a distance between a horizontal base line and each dot on the vertical line individually indicates a rotational speed and direction of each of the rotary element. In the complex planetary gear unit, the carrier C1 and the sun gear S2 connected to each other through the first clutch CL1 serve as an input element to which the engine torque is applied, the sun gear S1 serves as a reaction element to which, the first motor torque is applied, and the ring gear R2 connected to the output unit 8 serves as an output element.

In the vehicle Ve, a torque ratio ρ between the engine torque applied to the input element of the complex planetary gear unit to the second torque applied to the output element of the complex planetary gear unit can be changed arbitrarily. For example, given that the torque applied to the input element from the engine 1 is "1", the torque ratio ρ_H in the high mode can be expressed as:

$$\rho\_H = 1/(1 + gr_1 + gr_1 \cdot gr_2)$$

where "$gr_1$" is a gear ratio of the first planetary gear unit 4 between teeth numbers of the ring gear R1 and the sun gear S1, and "$gr_2$" is a gear ratio of the second planetary gear unit 5 between teeth numbers of the ring gear R2 and the sun gear S2.

In the high mode of the EV mode, the engine 1 can be started by disengaging the brake BK while operating the first motor 2 as a motor. That is, a cranking of the engine 1 can be executed by the torque of the first motor 2. When the rotational speed of the engine 1 is raised to a self-sustaining speed, the startup of the engine 1 is completed and the operating mode of the vehicle Ve is shifted from the high mode of the EV mode to the high mode of the HV mode as indicated by a dashed-dotted line in FIG. 4.

Figure 5:
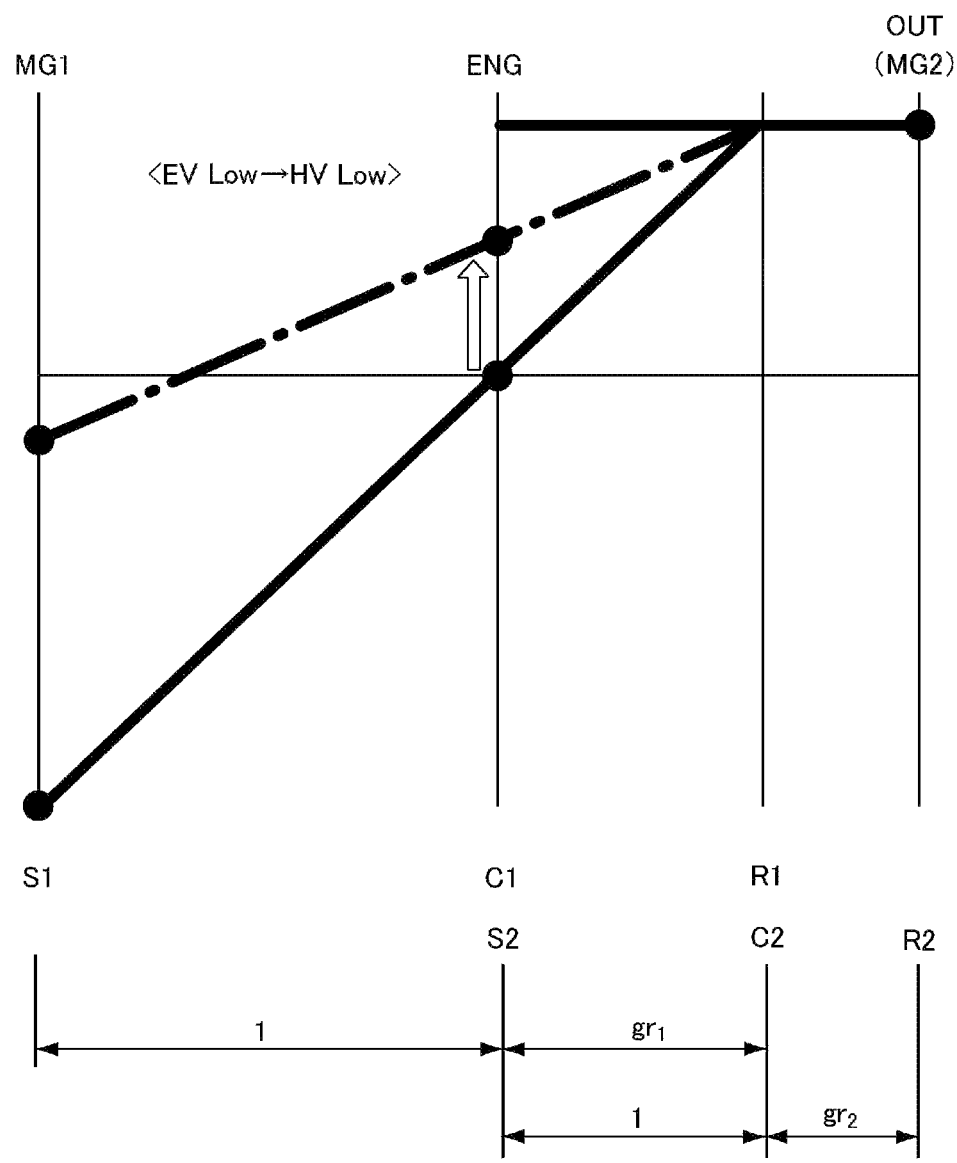
FIG. 5 is a nomographic diagram showing a situation of the hybrid vehicle having the gear train shown in FIG. 2 in the low mode.

Rotational speeds of the rotary elements of the complex planetary gear unit in the low modes are indicated in a nomographic diagram shown in FIG. 5. In the low mode, the first planetary gear unit 4 is disconnected from the second planetary gear unit 5, and the power is delivered from the ring gear R1 as an output element to the second planetary gear unit 5. In this situation, since the second planetary gear unit 5 is rotated integrally the ring gear R2 serving as an output element is rotated at a same speed as the carrier C2 serving as an input element, and hence the torque of the ring gear R1 of the first planetary gear unit 4 is delivered to the output unit 8 without being changed by the second planetary gear unit 5. In the low mode, therefore, rotational speed of the output unit 8 is lowered in comparison with that in the high mode at same rotational speeds of the engine 1 and the first motor 2. For this reason, the speed ratio is increased in the amount of reduction in the rotational speed of the output unit 8. In this situation, the torque of the engine 1 is distributed only by the first planetary gear unit 4, and given that the torque applied to the input element from the engine 1 is "1" the torque ratio ρ_L in the low mode can be expressed as:

$$\rho\_L = 1/(1 + gr_1).$$

That is, the torque ratio ρ_L in the low mode is increased to be greater than the torque ratio ρ_H in the high mode as expressed as "ρ_L > ρ_H".

In the low mode of the EV mode, the engine 1 may also be started by disengaging the brake BK while operating the first motor 2 as a motor. That is, a cranking of the engine 1 may also be executed by the torque of the first motor 2. When the rotational speed of the engine 1 is raised to the self-sustaining speed, the startup of the engine 1 is completed and the operating mode of the vehicle Ve is shifted from the low mode of the EV mode to the low mode of the HV mode as indicated by a dashed-dotted line in FIG. 5.

In the EV mode, disconnecting mode is established by disengaging both of the first clutch CL1 and the second clutch CL2, and the engine 1 is stopped in the disconnecting mode. In the disconnecting mode, therefore, the carrier C1 of the first planetary gear unit 4 and the sun gear S2 of the second planetary gear unit 5 are idled without transmitting power. In this situation, the first motor 2 is not operated as a motor but the second motor 3 is operated as a motor. Consequently, the vehicle Ve is powered efficiently by the second motor 3 while disconnecting the engine 1 and the first motor 2 from the powertrain.

In the EV mode, locking mode is established by engaging all of the first clutch CL1, the second clutch CL2 and the brake BK. As described, the second planetary gear unit 5 is rotated integrally by engaging the second clutch CL2, and the sun gear S2 of the second planetary gear unit 5 is connected to the engine 1 by engaging the first clutch CL1. In addition, the rotation of the output shaft 1a of the engine 1 connected to the carrier C1 is stopped by engaging the brake BK. In the licking mode, therefore, both of the first planetary gear unit 4 and the second planetary gear unit 5 are locked entirely, and consequently the driveshaft 27 is locked through the output unit 8 and the differential 25. Thus, the locking mode is uses as a parking brake to keep stopping the vehicle Ve by halting the driveshaft 27.

The controller 11 is configured to start the engine 1 properly to shift the operating mode from the EV mode to the HV mode by carrying out the following control.

Figure 6:
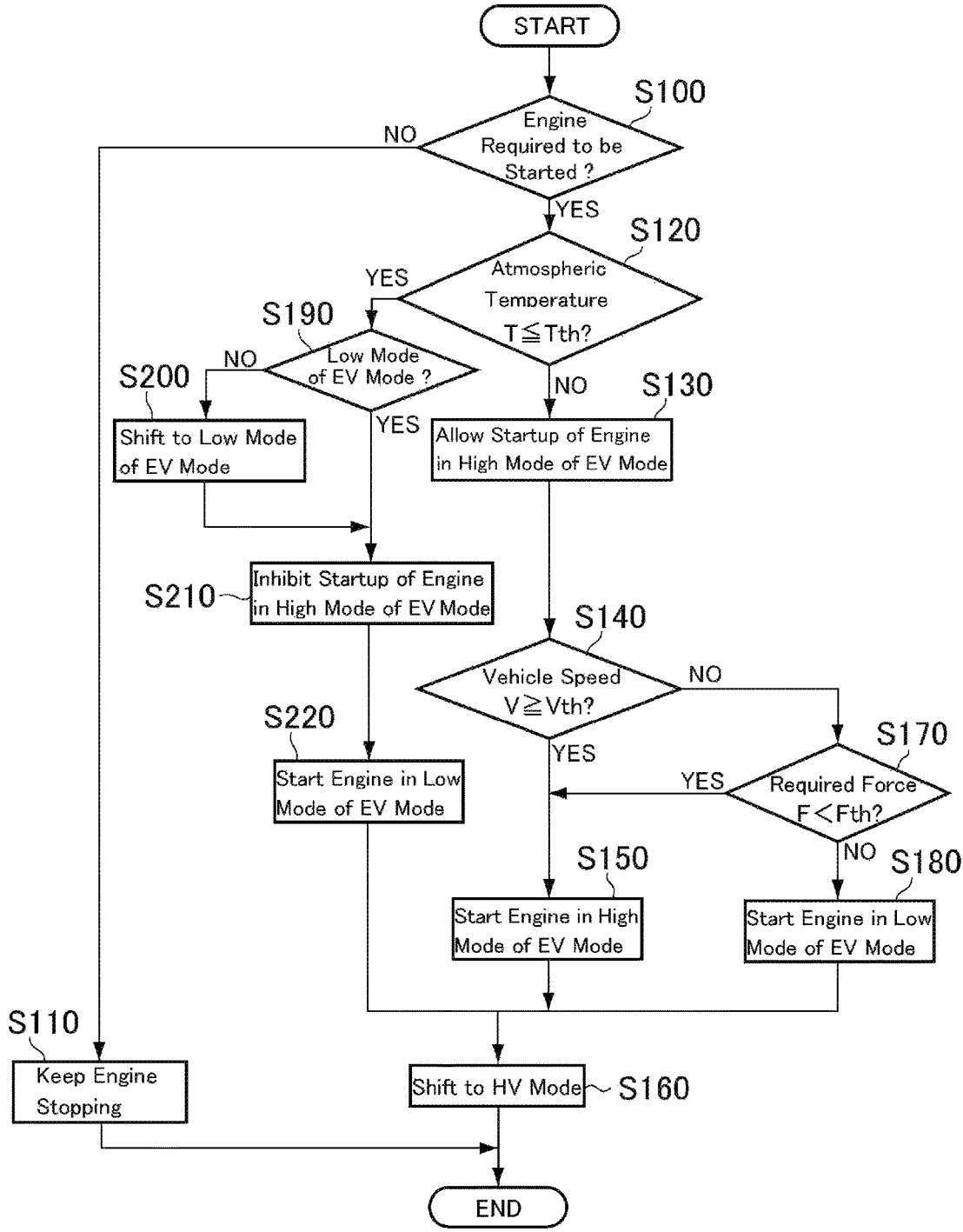
FIG. 6 is a flowchart showing a control example carried out by the control system according to the preferred embodiment.

Turning to FIG. 6, there is shown one example of a routine to be executed by the controller 11 during propelling the vehicle Ve at least by the second motor 3 while stopping the engine 1.

In the routine shown in FIG. 6, first of all, it is determined at step S100 whether or not the engine 1 is required to be started. For example, the engine 1 is required to be started when a required driving force cannot be achieved by a maximum driving force in the EV mode, or when an SOC (i.e., state of charge) level of a battery not shown falls below a predetermined level. Such determination at step S100 may be made based on a control signal sent to the engine 1.

If the engine 1 is not required to be started so that the answer of step S100 is NO, the routine progresses to step S110 to keep the engine 1 stopping, and the routine is returned.

By contrast, is required to be started so that the answer of step S100 is YES, the routine progresses to step S120 to determine whether or not an atmospheric temperature T is lower than a threshold value Tth. For example, the atmospheric temperature T may be measured by the temperature sensor 17. Alternatively, the atmospheric temperature T may also be estimated based on a detection value of the oil temperature sensor 18. Given that the atmospheric temperature is extremely low, viscosity of lubrication oil of the engine 1 is increased and a discharged capacity of the battery is decreased. In this situation, therefore, it is difficult to start the engine 1. In order to determine such condition, the threshold value Tth is set based on an experimental result to the lowest temperature at which the engine 1 can be started.

If the atmospheric temperature T is higher than the threshold value Tth so that the answer of step S120 is NO, the routine progresses to step S130 to allow startup of the engine 1 in the high mode of the EV mode. In this case, specifically, an inhibition flag for inhibiting startup of the engine 1 in the high mode of the EV mode is turned off. The inhibition flag will be turned on when the condition to inhibit startup of the engine 1 is satisfied.

Figure 7:
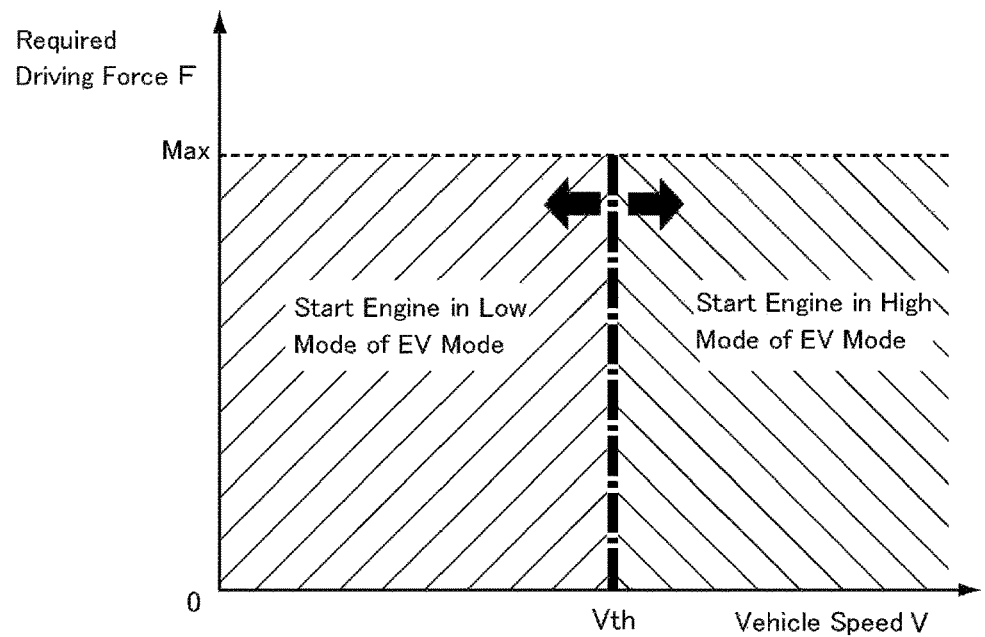
FIG. 7 is an illustration showing a threshold Vth of vehicle speed used in the routine shown in FIG. 6.

Then, it is determined at step S140 whether or not a vehicle speed V is higher than a threshold value Vth. As shown in FIG. 7, the threshold value Vth of the vehicle speed V is set based on an experimental result to a lowest speed at which the engine 1 can be started properly in the high mode of the EV mode. Specifically, if the vehicle speed V is higher than the threshold value Vth, the engine 1 will be started in the high mode of the EV mode. By contrast, if the vehicle speed V is lower than the threshold value Vth, the engine 1 will be started in the low mode of the EV mode.

Figure 8:
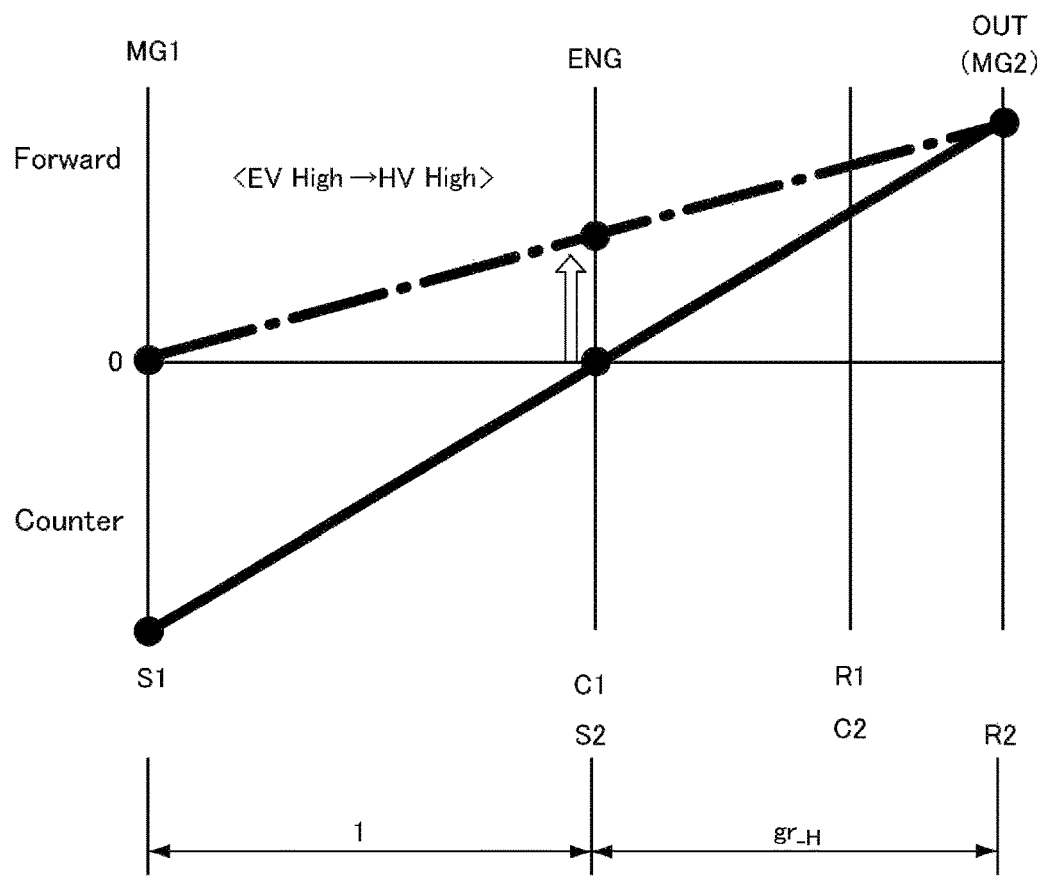
FIG. 8 is a nomographic diagram showing a situation of the hybrid vehicle having the gear train shown in FIG. 2 in the high mode, in which gr_H is a gear ratio of a complex planetary gear unit formed of a first planetary gear unit and a second planetary gear unit.
Figure 9:
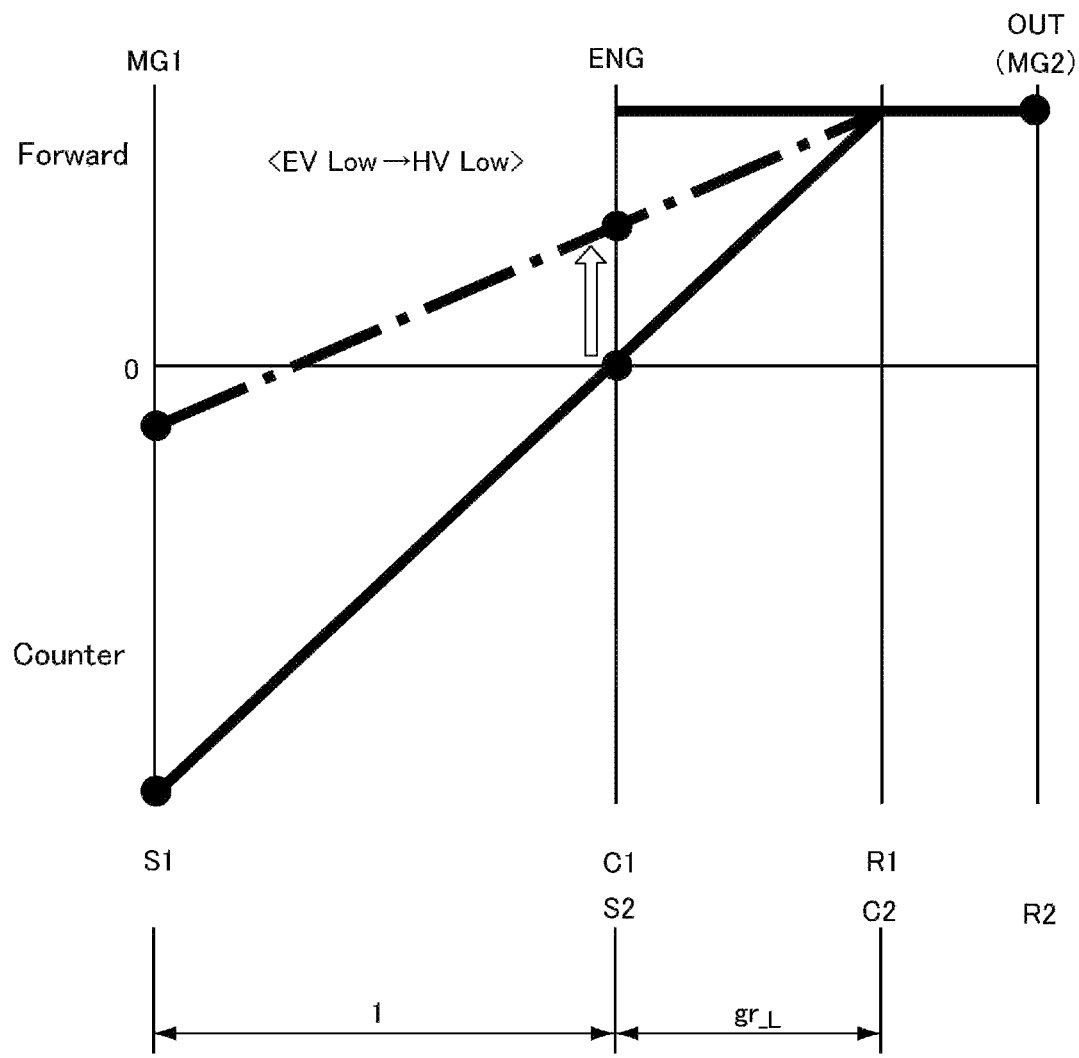
FIG. 9 is a nomographic diagram showing a situation of the hybrid vehicle having the gear train shown in FIG. 2 in the low mode, in which gr_L is a gear ratio of a complex planetary gear unit formed of a first planetary gear unit and a second planetary gear unit.

Here will be explained the threshold value Vth of the vehicle speed V in more detail. As shown in FIG. 8, a gear ratio of the complex planetary gear unit in the high mode of the EV mode is "gr_H". By contrast, as shown in FIG. 9, a gear ratio of the complex planetary gear unit in the low mode of the EV mode is "gr_L". As can be seen from FIGS. 8 and 9, the gear ratio gr_L is smaller than the gear ratio gr_H as expressed as "gr_L<gr_H". In the process of starting the engine 1 by the first motor 2, the first motor 2 serving as a generator starts serving as a motor when the rotational speed thereof is reduced to substantially zero. Given that a gear ratio of the gear train from the output unit 8 to the driveshaft 27 is "i_diff", a dynamic loaded radius of tire is "R", and a rotational speed of the engine 1 immediately after the startup is an "idling speed N_idl", a first vehicle speed "V_H" at a point when the first motor 2 serving as a generator starts serving as a motor in the process of starting the engine 1 by the first motor 2 in the high mode of the EV mode can be calculated using the following formula:

$$V\_H = (1+gr\_H) \cdot N\_idl \cdot 2 \cdot \pi \cdot R/i\_diff.$$

Likewise, a second vehicle speed "V_L" at a point when the first motor 2 serving as a generator starts serving as a motor in the process of starting the engine 1 by the first motor 2 in the low mode of the EV mode can be calculated using the following formula:

$$V\_L = (1+gr\_L) \cdot N\_idl \cdot 2 \cdot \pi \cdot R/i\_diff.$$

Figure 10:
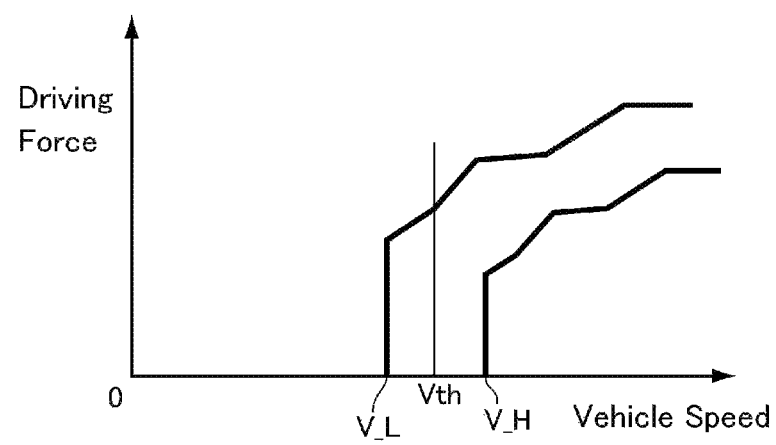
FIG. 10 is a graph indicating a first vehicle speed V_H at which a first motor serving as a generator starts serving a motor during starting the engine in the high mode, a second vehicle speed V_L at which the first motor serving as a generator starts serving a motor during starting the engine in the low mode, and the threshold Vth set in between the first vehicle speed V_H and the second vehicle speed V_L.

As described, since the gear ratio gr_L is smaller than the gear ratio gr_H, the second vehicle speed V_L is higher than the first vehicle speed V_H. Accordingly, as indicated in FIG. 10, the threshold value Vth of the vehicle speed V is set to a value between the second vehicle speed V_L and the first vehicle speed V_H as expressed as "V_L<Vth<V_H". In FIG. 10, specifically, the vertical axis represents the driving force, and the horizontal axis represents the vehicle speed. As can be seen from FIG. 10, the threshold value Vth falls between the second vehicle speed V_L and the first vehicle speed V_H.

If the vehicle Ve is propelled in the low mode at a speed higher than the second vehicle speed V_L, a power circulation may occur thereby increasing an electrical loss especially in a low driving force range. Such electrical loss may be reduced by shifting the operating mode from the low mode to the high mode within the speed range higher than the second vehicle speed V_L. By contrast, if the operating mode is shifted from the low mode to the high mode at a speed higher than the first vehicle speed V_H, an opportunity to reduce the electrical loss may be lost. Further, since power generation of the first motor 2 is larger in the high mode in comparison with that in the low mode, the electrical loss may be increased if the operating mode is shifted from the high mode to the low mode at a speed lower than the second vehicle speed V_L. For these reasons, the operating mode may be shifted properly between the low mode and the high mode by thus setting the threshold value Vth between the second vehicle speed V_L and the first vehicle speed V_H. Consequently, the engine 1 can be started properly depending on a travelling condition of the vehicle Ve while reducing the electrical loss.

Figure 11:
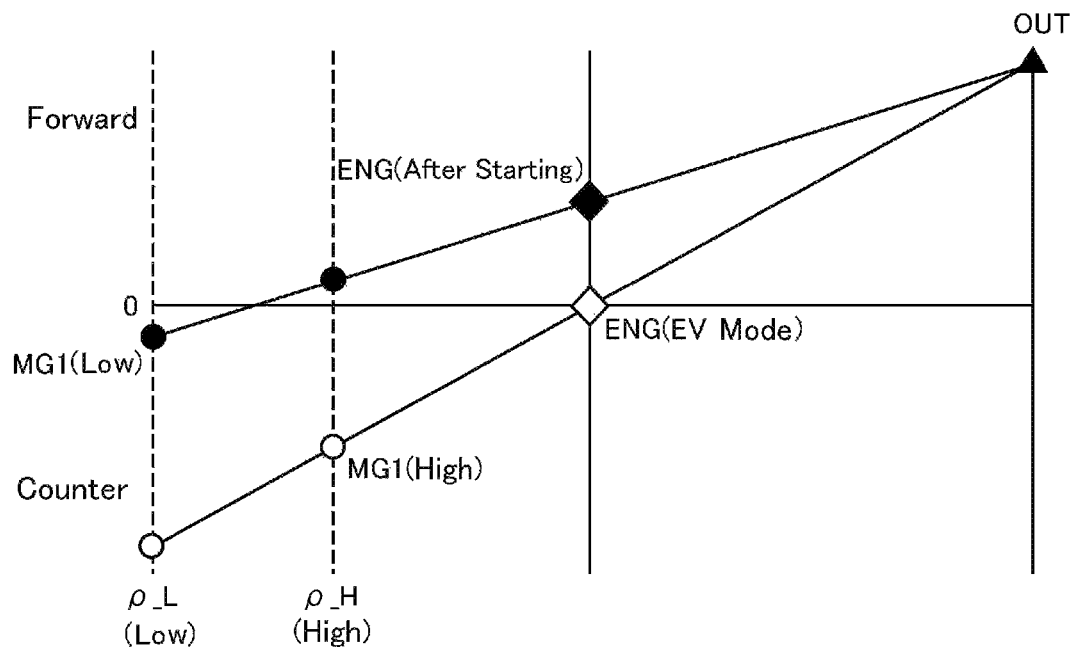
FIG. 11 is a nomographic diagram showing a difference between a case of starting the engine in the high mode during EV running at a high speed and a case of starting the engine in the low mode during EV running at a high speed.
Figure 12:
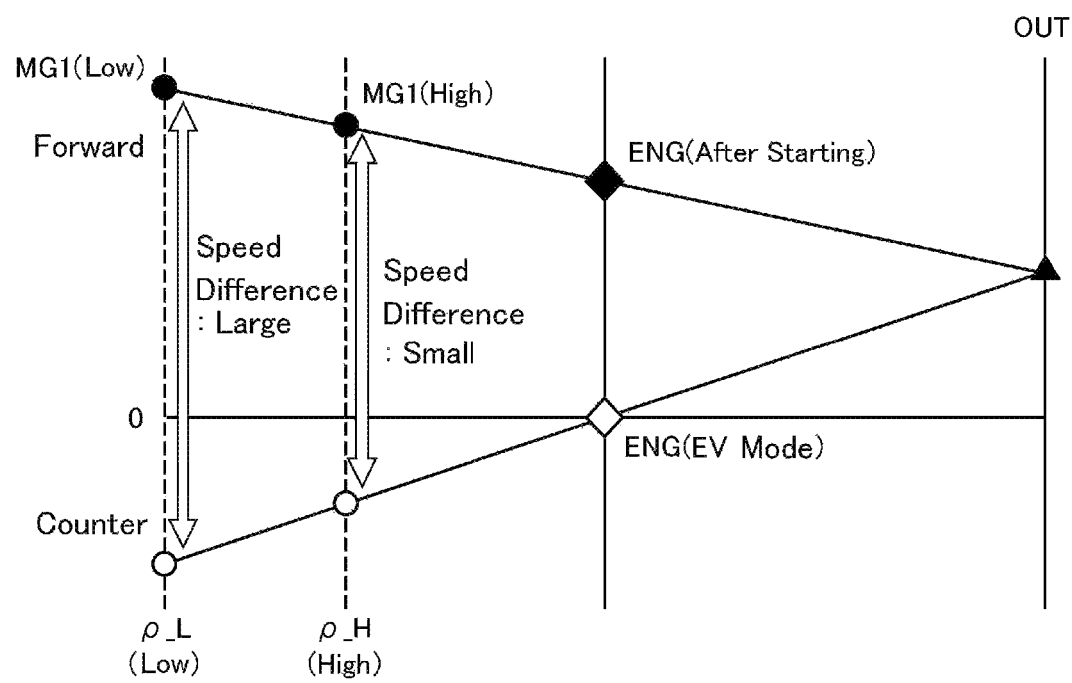
FIG. 12 is a nomographic diagram showing a difference between a case of starting the engine in the high mode during EV running at a low speed and a case of starting the engine in the low mode during EV running at a low speed.
Figure 16:
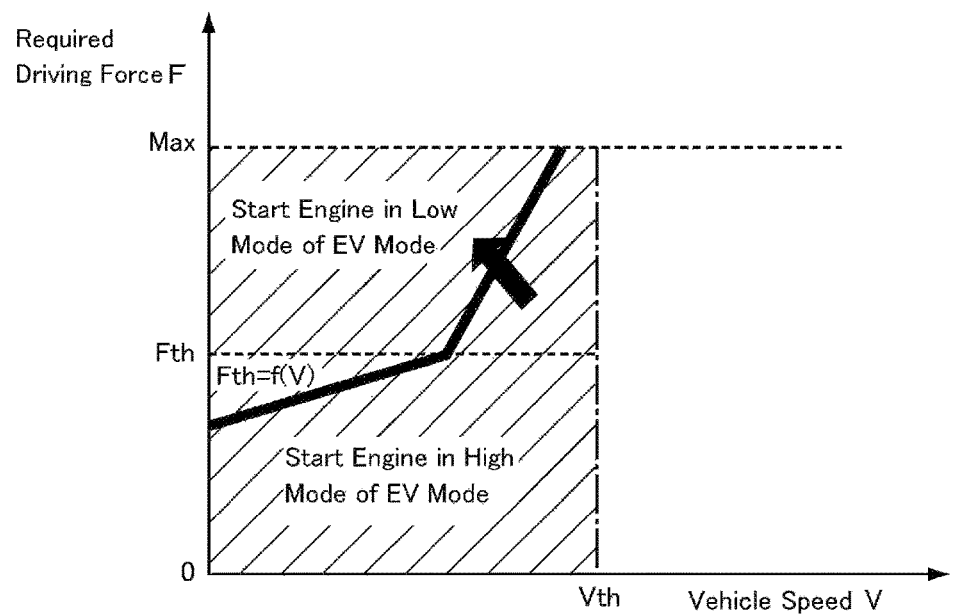
FIG. 16 an illustration showing a threshold Fth (Fth=f(V)) of driving force used in the routine shown in FIG. 15.
Figure 17:
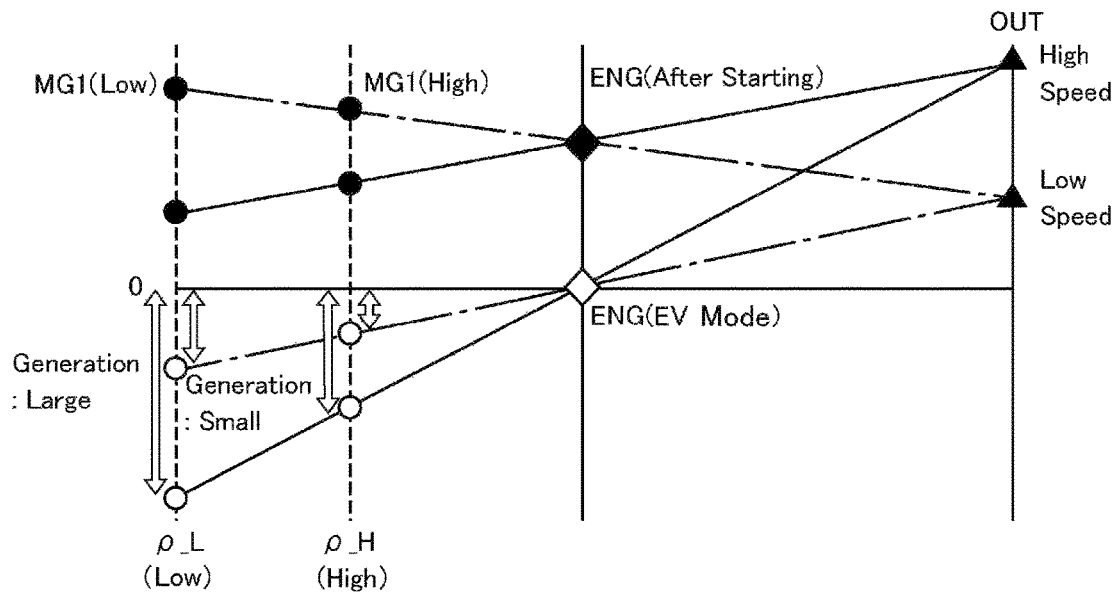
FIG. 17 a nomographic diagram showing a difference between a case of starting the engine in the high mode in accordance with a vehicle speed and a required driving force during EV running at a low speed, and a case of starting the engine in the low mode in accordance with a vehicle speed and a required driving force during EV running at a low speed.

In FIG. 11, and below-explained FIGS. 12, 16 and 17, a rotational speed of the first motor 2 in the high mode and a rotational speed of the first motor 2 in the low mode are indicated on different vertical axes in a nomographic diagram. As shown in FIG. 11, if the engine 1 is started in the low mode at a speed higher than the threshold value Vth, a rotational direction of the first motor 2 may remain in the counter direction even after the completion of the startup of the engine 1. In this situation, a power circulation may be caused as a result of operating the first motor 2 as a motor while operating the second motor 3 as a generator thereby increasing the electrical loss resulting from power conversion, in comparison with the case of starting the engine 1 in the high mode. For this reason, it is advantageous to start the engine 1 in the high mode if the vehicle speed is high. In the high mode, specifically, the engine 1 may be started while reducing the torque of the first motor 2 so that the power circulation can be avoided to reduce the electrical loss.

Turning back to FIG. 6, if the vehicle speed V is higher than the threshold value Vth so that the answer of step S140 is YES, the routine progresses to step S150 to start the engine 1 in the high mode of the EV mode. In this case, if the vehicle Ve is currently propelled in the high mode of the EV mode, the engine 1 is started without shifting the operating mode. By contrast, if the vehicle Ve is currently propelled in the low mode of the EV mode, the engine 1 is started after shifting the operating mode to the high mode of the EV mode.

Consequently, at step S160, the operating mode of the vehicle Ve is shifted to the HV mode in which the vehicle Ve is powered by the engine 1. In this situation, the first clutch CL1 is maintained to be engaged and the second clutch CL2 is maintained to be disengaged so that the vehicle Ve is propelled in the high mode of the HV mode after starting the engine 1. Then the routine is returned.

By contrast, in a case that the vehicle speed V is lower than the threshold value Vth, power outputs of the first motor 2 and the second motor 3 will be increased larger than the power output of the engine 1 if a large driving force is required when starting the engine 1 in the high mode, and consequently the electrical loss will be increased. In this case, such electrical loss may be reduced by starting the engine 1 in the low mode so as to increase a percentage of the torque delivered directly from the engine 1 to the output unit 8 through a mechanical means such as a gear unit. However, as indicated in FIG. 12, a difference between the rotational speeds of the first motor 2 before and after starting the engine 1 will be increased if the engine 1 is started in the low mode at a low speed. In this case, therefore, a power loss of the first motor 2 will be increased as a result of starting the engine 1 in comparison with that of the case in which the engine 1 is started in the high mode. For this reason, if the vehicle speed V is low, it is advantageous to start the engine 1 while switching the operating mode between the high mode and the low mode depending on the required driving force.

Figure 13:
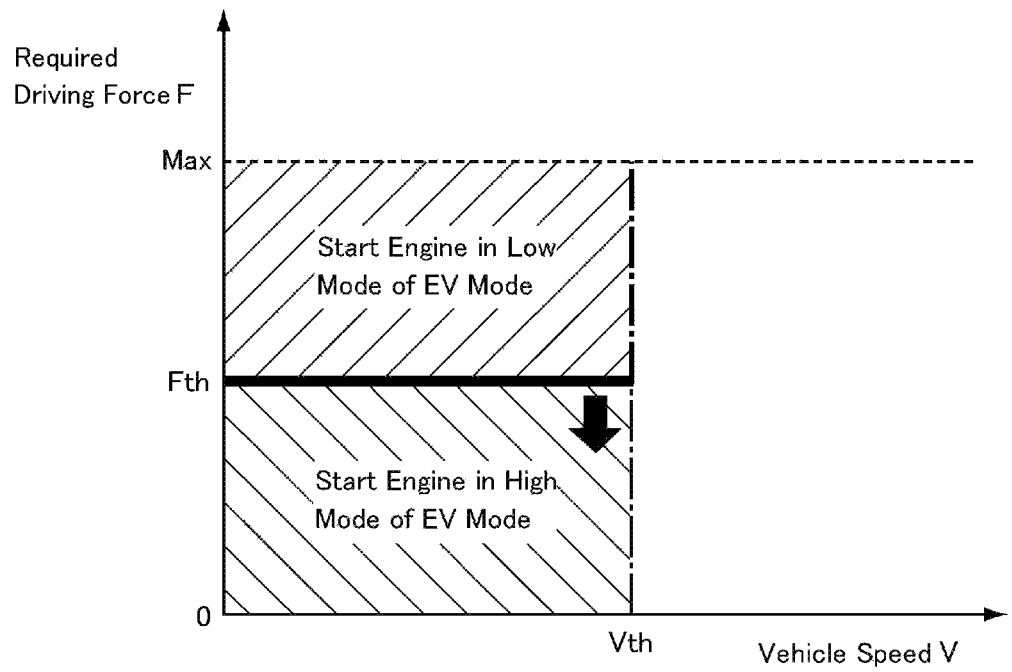
FIG. 13 an illustration showing a threshold Fth of driving force used in the routine shown in FIG. 6.

For this purpose, if the vehicle speed V is lower than the threshold value Vth, so that the answer of step S140 is NO, the routine progresses to step S170 to determine whether or not a required driving force F is smaller than a threshold value Fth of the driving force. As indicated in FIG. 13, the threshold value Fth is set based on an experimental result to an upper limit value of the driving force by which the engine 1 can be started properly in the high mode of the EV mode. At step S170, therefore, the controller 11 determines that it is preferable to start the engine 1 in the high mode of the EV mode if the required driving force F is smaller than the threshold value Fth. By contrast, if the required driving force F is greater than the threshold value Fth, the controller 11 determines that it is preferable to start the engine 1 in the low mode of the EV mode.

If the required driving force F is smaller than the threshold value Fth so that the answer of step S170 is YES, the routine progresses to steps S150 and S160 to start the engine 1 in the high mode of the EV mode thereby propelling the vehicle Ve in the HV mode. As described, the first clutch CL1 is maintained to be engaged and the second clutch CL2 is maintained to be disengaged in this situation so that the vehicle Ve is propelled in the high mode of the HV mode after starting the engine 1. Then the routine is returned.

By contrast, if the required driving force F is greater than the threshold value Fth so that the answer of step S170 is NO, the routine progresses to step S180 to start the engine 1 in the low mode of the EV mode. In this case, if the vehicle Ve is currently propelled in the low mode of the EV mode, the engine 1 is started without shifting the operating mode. By contrast, if the vehicle Ve is currently propelled in the high mode of the EV mode, the engine 1 is started after shifting the operating mode to the low mode of the EV mode.

After starting the engine 1 at step S180, the routine progresses to steps S160 to propel the vehicle Ve in the high mode. In this case, the first clutch CL1 is maintained to be disengaged and the second clutch CL2 is maintained to be engaged so that the vehicle Ve is propelled in the low mode of the HV mode after starting the engine 1. Then the routine is returned.

Turning back to step S120, if the atmospheric temperature T is lower than the threshold value Tth so that the answer of step S120 is YES, the routine progresses to step S190 to determine whether or not the vehicle Ve is currently propelled in the low mode of the EV mode.

If the vehicle Ve is not propelled in the low mode of the EV mode so that the answer of step S190 is NO, the routine progresses to step S200 to shift the operating mode to the low mode of the EV mode. In the vehicle Ve shown in FIG. 2, specifically, the first clutch CL1 is disengaged and the second clutch CL2 is engaged.

Then, at step S210, the aforementioned inhibition flag is turned on to inhibit startup of the engine 1 in the high mode of the EV mode.

By contrast, if the vehicle Ve is currently propelled in the low mode of the EV mode so that the answer of step S190 is YES, the routine progresses directly to step S210 to turn on the inhibition flag.

Then, at step S220, the engine 1 is started in the low mode of the EV mode. In this case, since the startup of the engine 1 in the high mode has been inhibited, the engine 1 is started in the low mode of the EV mode irrespective of the vehicle speed V and the required driving force F.

Figure 14:
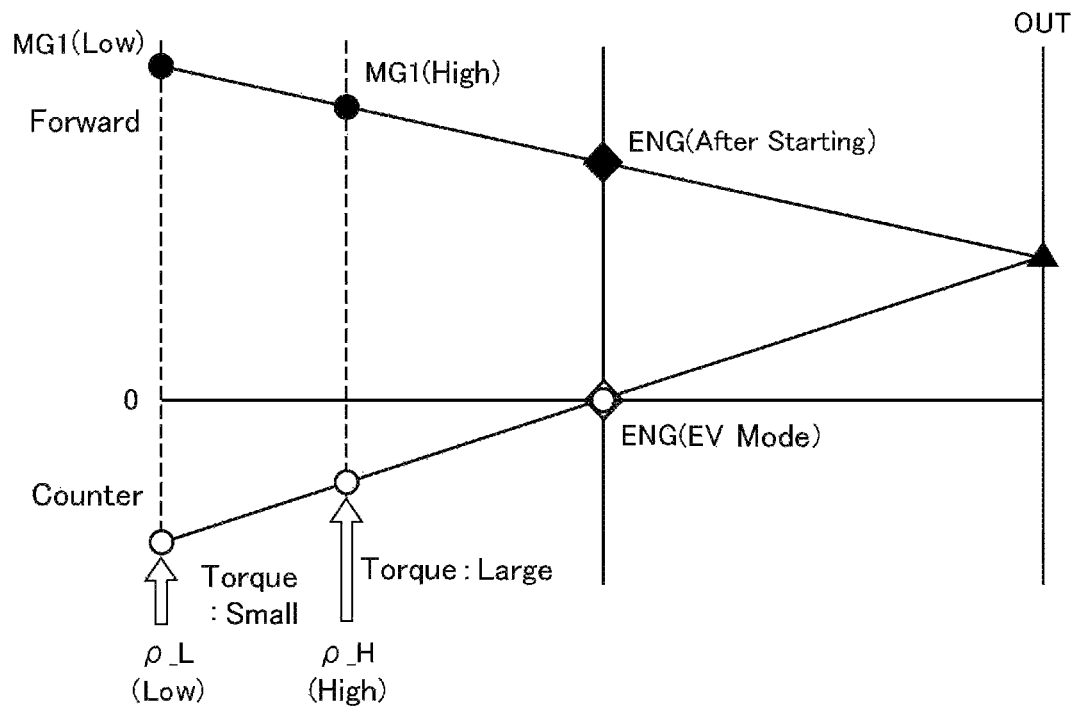
FIG. 14 is a nomographic diagram showing a difference between a case of starting the engine in the high mode at extremely low temperature and a case of starting the engine in the low mode at extremely low temperature.

As described, if the atmospheric temperature is extremely low, viscosity of the lubrication oil is increased and the discharged capacity of the battery is decreased. In this situation, if the engine 1 is started in the high mode, cranking of the engine 1 may be incomplete or it may take longer time to complete cranking of the engine 1 due to shortage of torque as indicated in FIG. 14. Consequently, larger amount of energy may be consumed to start the engine 1 in comparison with that of the case of starting the engine 1 at the extremely low temperature. For this reason, if the atmospheric temperature is extremely low, startup of the engine 1 in the high mode is inhibited and the engine 1 is started in the low mode.

After starting the engine 1 at step S220, the routine progresses to steps S160 to propel the vehicle Ve in the high mode. In this case, the first clutch CL1 is maintained to be disengaged and the second clutch CL2 is maintained to be engaged so that the vehicle Ve is propelled in the low mode of the HV mode after starting the engine 1. Then the routine is returned.

Figure 15:
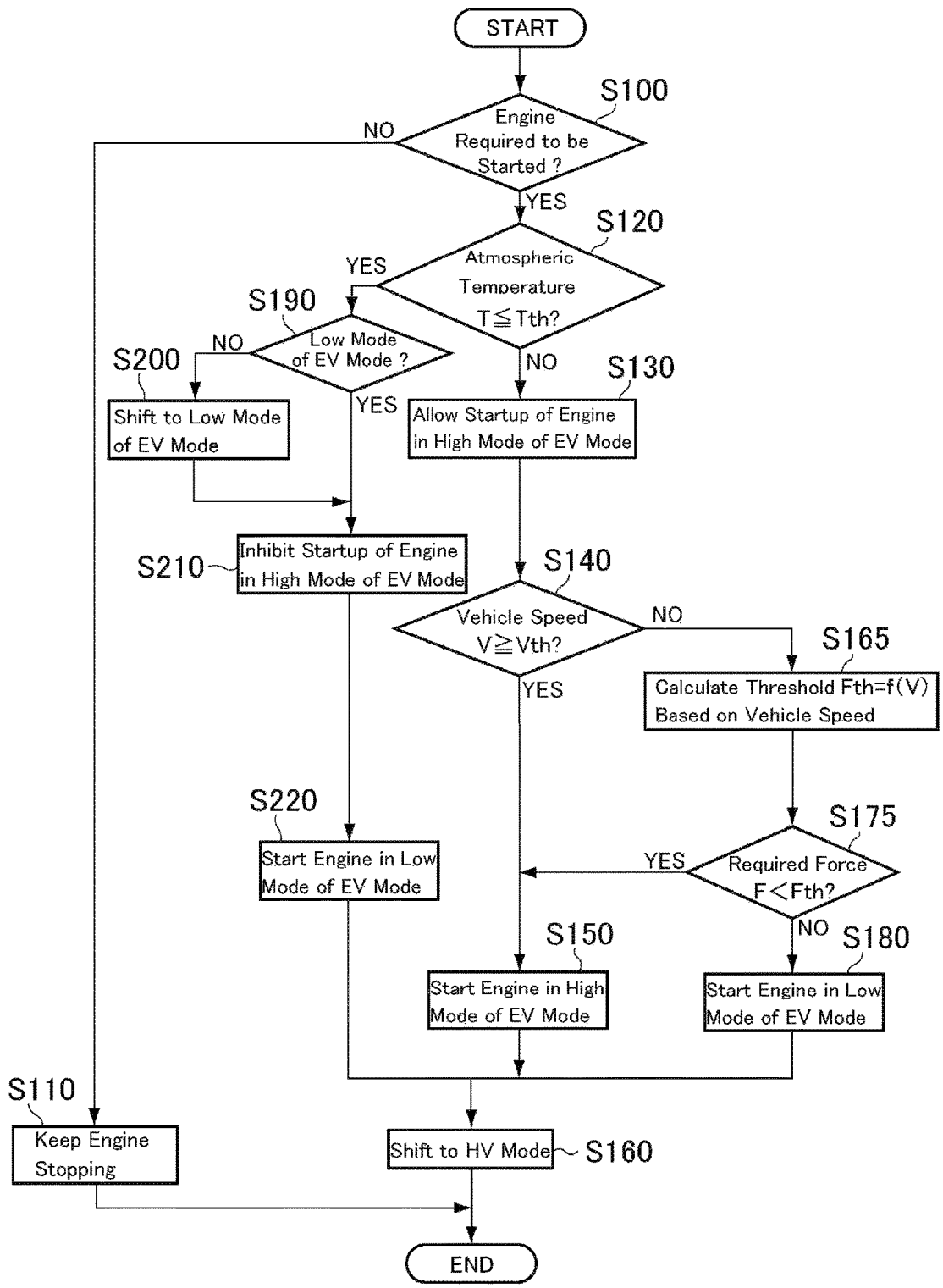
FIG. 15 a flowchart showing another control example carried out by the control system according to the preferred embodiment.

Turning to FIG. 15, there is shown another control example in which the threshold value Fth of the driving force is altered in accordance with the vehicle speed V. At step S165, specifically, the threshold value Fth of the driving force is calculated based on a function f(V) in which the vehicle speed V is used as a parameter. As indicated in FIG. 16, the function f(V) is set in such a manner that selectability of the high mode to start the engine 1 is increased with an increase in the vehicle speed V and with a reduction in the required driving force F. That is, the threshold value Fth is increased with an increase in the vehicle speed V. Although the function f(V) is set as a combination of two linear function of different slopes, the function f(V) may also be set as a quadric function or an approximated curve based on an experimental result.

After calculating the threshold value Fth at step S165, it is determined at step S175 whether or not the required driving force F is smaller than the threshold value Fth.

If the required driving force F is smaller than the threshold value Fth so that the answer of step S175 is YES, the routine progresses to steps S150 and S160 to start the engine 1 in the high mode of the EV mode thereby propelling the vehicle Ve in the high mode of the HV mode.

By contrast, if the required driving force F is greater than the threshold value Fth so that the answer of step S175 is NO, the routine progresses to steps S180 and S116 to start the engine 1 in the low mode of the EV mode thereby propelling the vehicle Ve in the low mode of the HV mode.

During propelling the vehicle Ve by the motor(s), a rotational speed of the first motor 2 is increased in the counter direction. In this situation, a generation amount of the first motor 2 is increased instantaneously when starting the engine 1 and consequently the electricity is generated excessively. However, since such excessive electricity is not generated on the basis of a generation demand, the excessive electricity may not be collected by the power source 9. As shown in FIG. 17, a generation amount of the first motor 2 when starting the engine 1 is larger in the low mode than that in the high mode. Also, the generation amount of the first motor 2 when starting the engine 1 is larger in a high speed range that that in a low speed range. For these reasons, the threshold value Fth is increased with an increase in the vehicle speed V. To this end, the above-explained function f(V) is set in such a manner that the selectability of the high mode to start the engine 1 is increased if the vehicle speed V is high and the required driving force F is small. In other words, the function f(V) is set in such a manner that the selectability of the high mode to start the engine 1 is increased with a reduction in the required driving force F especially in a region where the required driving force F is large and an output power of the second motor 3 to propel the vehicle Ve is larger than a power to generate electricity by the first motor 2. For this reason, the engine 1 can be started properly while achieving the required driving force and suppressing excessive generation.

As has been explained, in the vehicle Ve shown in FIG. 2, the first planetary gear unit 4 and the second planetary gear unit 5 are allowed to serve as a complex planetary gear unit by connecting the ring gear R1 of the first planetary gear unit 4 to the carrier C2 of the second planetary gear unit 5, while selectively connecting the carrier C1 of the first planetary gear unit 4 to the sun gear S2 of the second planetary gear unit 5. In the complex planetary gear unit, a torque ratio between the input element and the output element can be altered by manipulating the first clutch CL1 and the second clutch CL2. Modified examples of the complex planetary gear unit are shown in FIGS. 18, 19, 21, 23 and 25.

Figure 18:
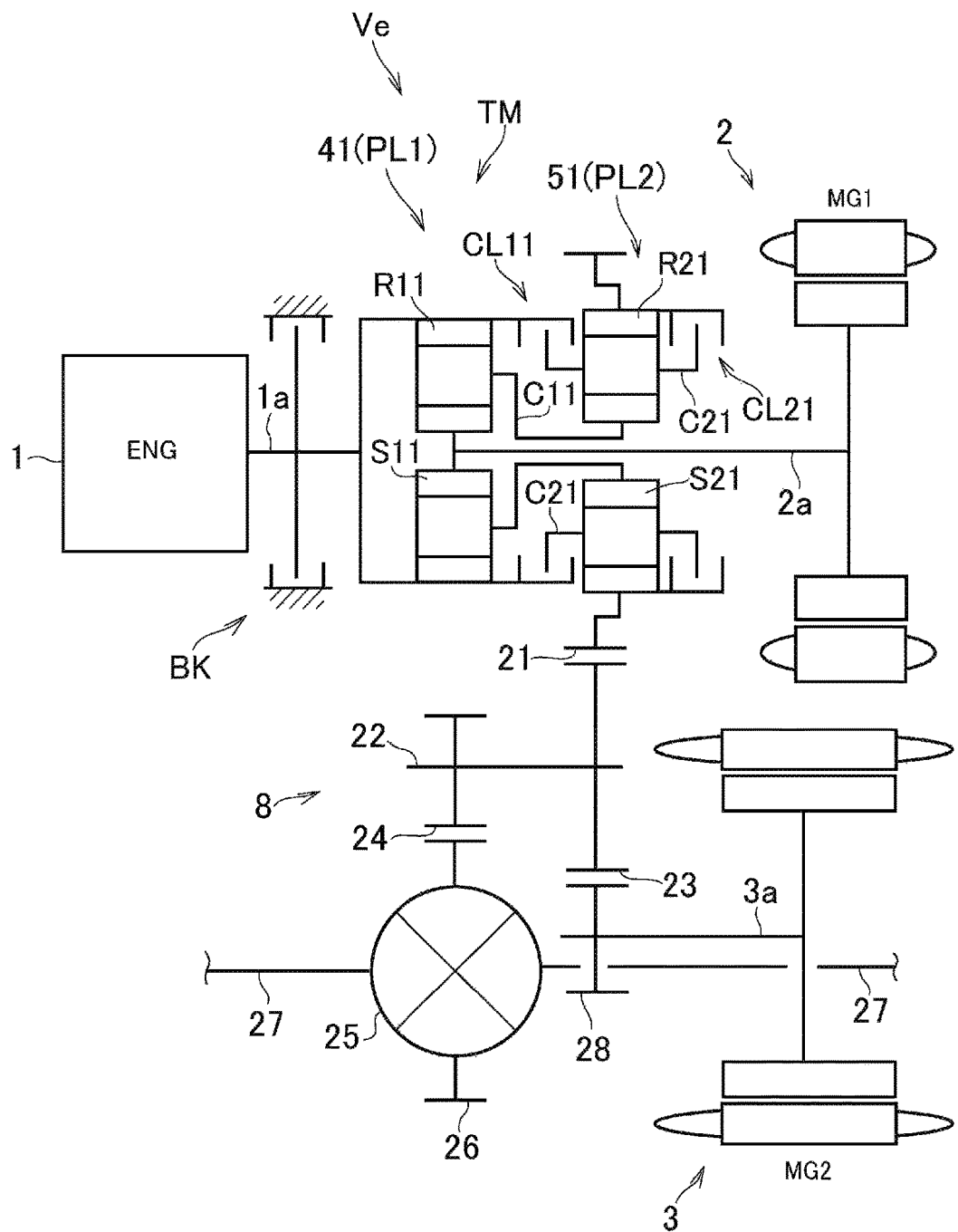
FIG. 18 is a schematic illustration showing a second example of a gear train of the hybrid vehicle shown in FIG. 1.

Turning to FIG. 18, there is shown the second example of the gear train of the vehicle Ve to which the control system according to the preferred example is applied. According to the second example, the transmission TM comprises: a first single-pinion planetary gear unit (referred to as "PL1" in FIG. 18) 41 including a sun gear S11, a ring gear R11 and a carrier C11; a second single-pinion planetary gear unit (referred to as "PL2" in FIG. 18) 51 including a sun gear S21, a ring gear R21 and a carrier C21; a first clutch CL11 that selectively connects the ring gear R11 to the carrier C21; and a second clutch CL21 that selectively connects the ring gear R21 to the carrier C21 to rotate the second planetary gear unit 51 integrally. The ring gear R11 is connected to the engine 1, the sun gear S11 is connected to the first motor 2, the carrier C11 is connected to the sun gear S21, and the ring gear R21 is connected to the output unit 8. A rotation of the ring gear R11 to which an engine torque is applied is selectively stopped by the brake BK. The remaining structures of the gear train shown in FIG. 18 are similar to that the first example shown in FIG. 2, and detailed explanations for the common elements will be omitted by allotting common reference numerals thereto.

In the first planetary gear unit 41, accordingly, the ring gear R11 serves as the first input element 4a, the sun gear S11 serves as the first reaction element 4b, and the carrier C11 serves as the first output element 4c. On the other hand, in the second planetary gear unit 51, the sun gear S21 serves as the second input element 5a, the carrier C21 serves as the second reaction element 5b, and the ring gear R21 serves as the second output element 5c. Further, the first clutch CL11 serves as the first engagement device 6, the second clutch CL21 serves as the second engagement device 7 and the brake BK serves as the third engagement device 10.

In the vehicle Ve shown in FIG. 18, the high mode and the low mode are also available in both of the EV mode and the HV mode as indicated in FIG. 3. Accordingly, the routines shown in FIGS. 6 and 15 may also be executed in the vehicle Ve shown in FIG. 18.

Figure 19:
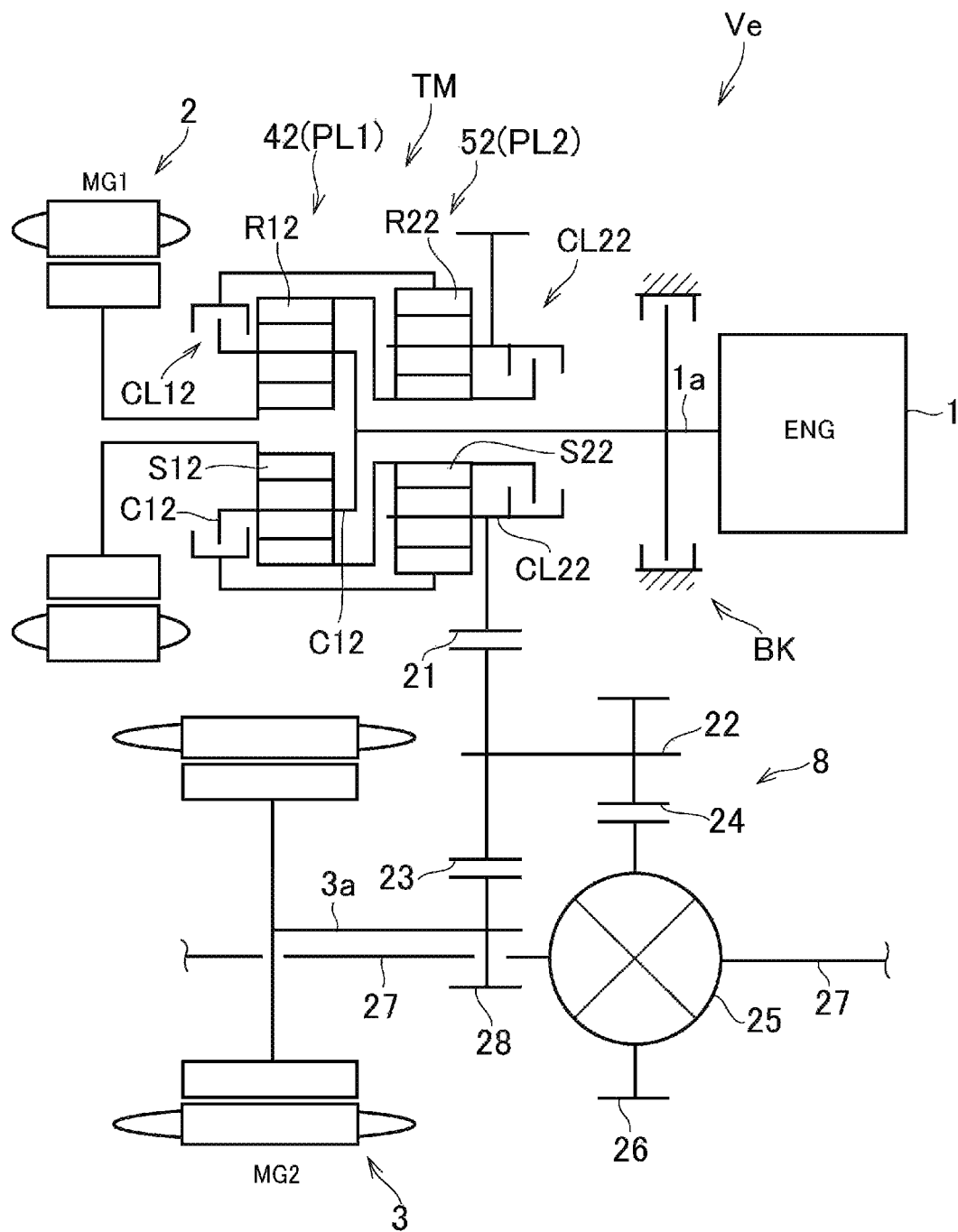
FIG. 19 is a schematic illustration showing a third example of a gear train of the hybrid vehicle shown in FIG. 1.

Turning to FIG. 19, there is shown the third example of the gear train of the vehicle Ve to which the control system according to the preferred example is applied. According to the third example, the transmission TM comprises: a first double-pinion planetary gear unit (referred to as "PL1" in FIG. 19) 42 including a sun gear S12, a ring gear R12 and a carrier C12; a second double-pinion planetary gear unit (referred to as "PL2" in FIG. 19) 52 including a sun gear S22, a ring gear R22 and a carrier C22; a first clutch CL12 that selectively connects the carrier C12 to the ring gear R22; and a second clutch CL22 that selectively connects the sun gear S22 to the carrier C22 to rotate the second planetary gear unit 52 integrally. The carrier C12 is connected to the engine 1, the sun gear S12 is connected to the first motor 2, the ring gear R12 is connected to the sun gear S22, and the carrier C22 is connected to the output unit 8. A rotation of the carrier C12 to which an engine torque is applied is selectively stopped by the brake BK. The remaining structures of the gear train shown in FIG. 19 are similar to that the first example shown in FIG. 2, and detailed explanations for the common elements will be omitted by allotting common reference numerals thereto.

In the first planetary gear unit 42, accordingly, the carrier C12 serves as the first input element 4a, the sun gear S12 serves as the first reaction element 4b, and the ring gear R12 serves as the first output element 4c. On the other hand, in the second planetary gear unit 52, the sun gear S22 serves as the second input element 5a, the ring gear R22 serves as the second reaction element 5b, and the carrier C22 serves as the second output element 5c. Further, the first clutch CL12 serves as the first engagement device 6, the second clutch CL22 serves as the second engagement device 7 and the brake BK serves as the third engagement device 10.

Figures 20, 21:
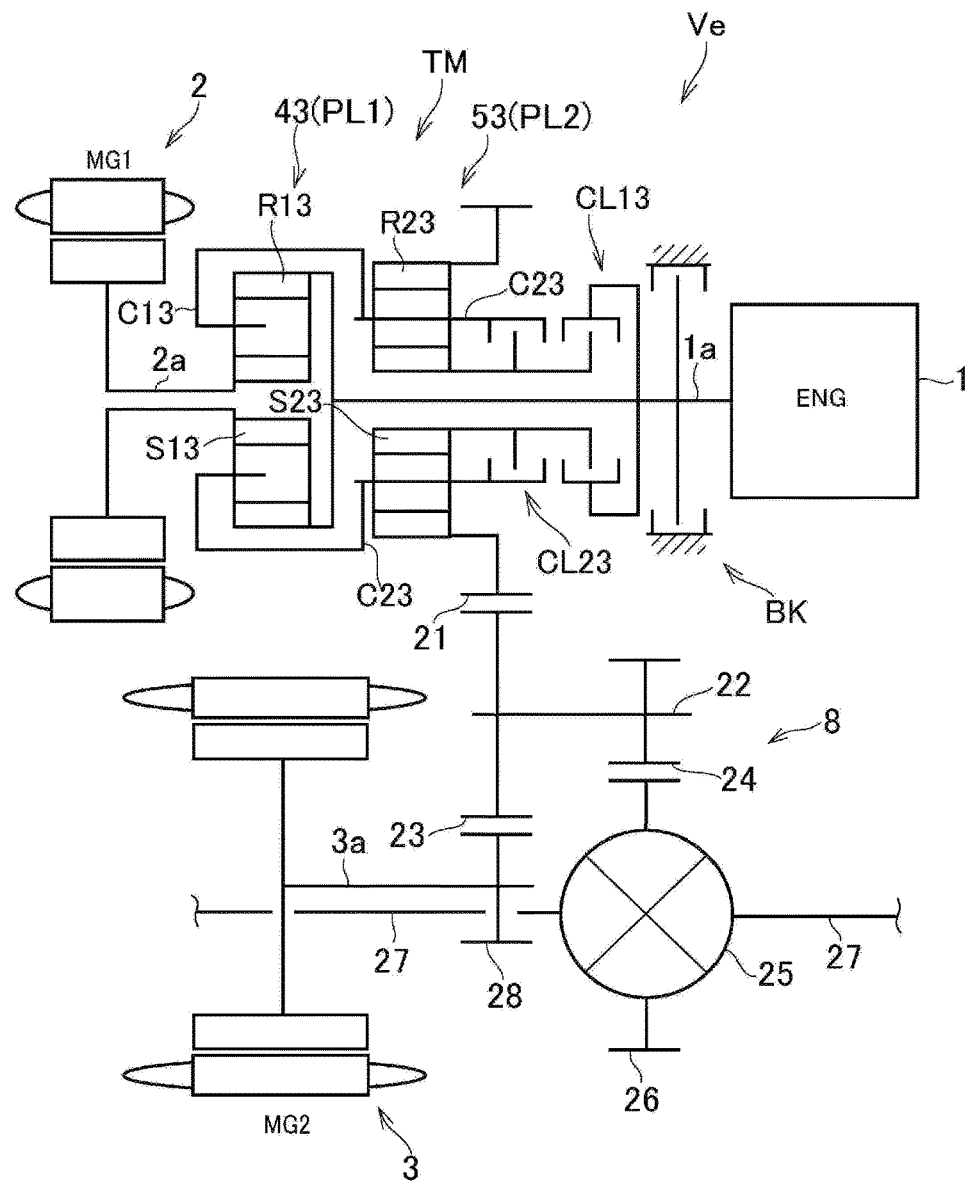
FIG. 20 is a table showing engagement states of engagement devices in the gear train shown in FIG. 19 in each operating mode.
FIG. 21 is a schematic illustration showing a fourth example of a gear train of the hybrid vehicle shown in FIG. 1.

The operating mode the vehicle Ve shown in FIG. 19 may also be selected from a plurality of modes, and engagement states of the clutches CL12 and CL22 and the brake BK are indicated in the table shown in FIG. 20. As indicated in FIG. 20, although engagement states of the clutches CL12 and CL22 and the brake BK are opposite to those in the vehicles Ve shown in FIGS. 2 and 18, the high mode and the low mode are also available in both of the EV mode and the HV mode in the vehicle Ve shown in FIG. 19. Accordingly, the routines shown in FIGS. 6 and 15 may also be executed in the vehicle Ve shown in FIG. 19.

Turning to FIG. 21, there is shown the fourth example of the gear train of the vehicle Ve to which the control system according to the preferred example is applied. According to the fourth example, the transmission TM comprises: a first single-pinion planetary gear unit (referred to as "PL1" in FIG. 21) 43 including a sun gear S13, a ring gear R13 and a carrier C13; a second double-pinion planetary gear unit (referred to as "PL2" in FIG. 21) 53 including a sun gear S23, a ring gear R23 and a carrier C23; a first clutch CL12 that selectively connects the ring gear R13 to the sun gear S23; and a second clutch CL23 that selectively connects the sun gear S23 to the carrier C23 to rotate the second planetary gear unit 53 integrally. The ring gear R13 is connected to the engine 1, the sun gear S13 is connected to the first motor 2, the carrier C13 is connected to the carrier C23, and the ring gear R23 is connected to the output unit 8. A rotation of the ring gear R13 to which an engine torque is applied is selectively stopped by the brake BK. The remaining structures of the gear train shown in FIG. 21 are similar to that the first example shown in FIG. 2, and detailed explanations for the common elements will be omitted by allotting common reference numerals thereto.

In the first planetary gear unit 43, accordingly, the ring gear R13 serves as the first input element 4a, the sun gear S13 serves as the first reaction element 4b, and the carrier C13 serves as the first output element 4c. On the other hand, in the second planetary gear unit 53, the carrier C23 serves as the second input element 5a, the sun gear S23 serves as the second reaction element 5b, and the ring gear R23 serves as the second output element 5c. Further, the first clutch CL13 serves as the first engagement device 6, the second clutch CL23 serves as the second engagement device 7 and the brake BK serves as the third engagement device 10.

In the vehicle Ve shown in FIG. 21, the high mode and the low mode are also available in both of the EV mode and the HV mode as indicated in FIG. 3. Accordingly, the routines shown in FIGS. 6 and 15 may also be executed in the vehicle Ve shown in FIG. 21.

In the vehicles Ve shown in FIGS. 2, 18 and 19, the engine torque delivered to the output unit 8 is multiplied when the rotational speed of the first motor 2 is zero. By contrast, in the vehicle Ve shown in FIG. 21, the engine torque delivered to the output unit 8 is reduced when the rotational speed of the first motor 2 is zero.

Figure 22:
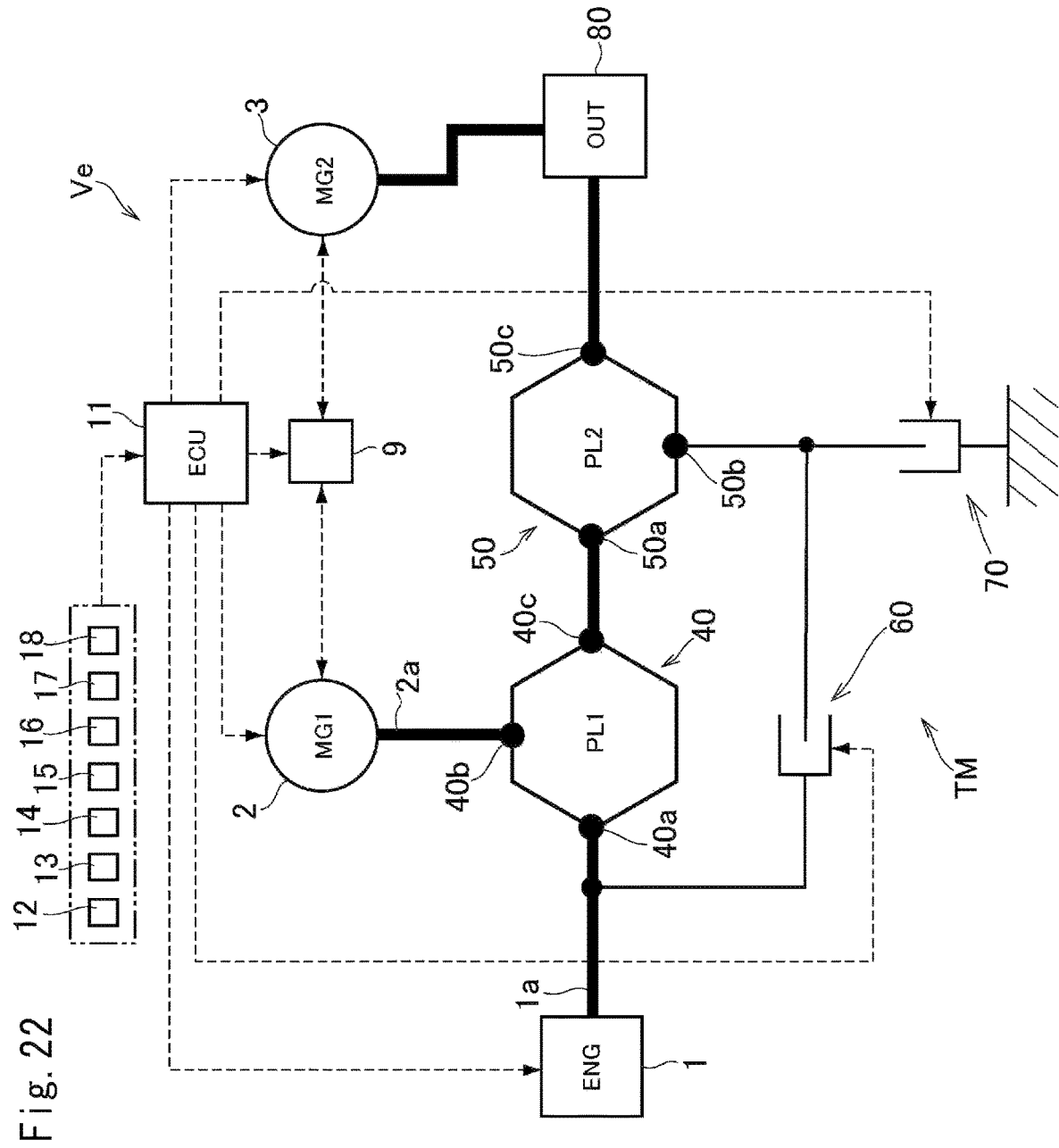
FIG. 22 is a block diagram showing another example of a drive system of the hybrid vehicle to which the control system according to the present disclosure is applied.

Turning to FIG. 22, there is shown another example of the drive system of the hybrid vehicle Ve to which the control system according to the preferred example is applied. The prime mover of the vehicle Ve shown in FIG. 22 also includes an engine (referred to as "ENG" in FIG. 22) 1, the first motor (referred to as "MG1" in FIG. 22) 2, and the second motor (referred to as "MG2" in FIG. 22) 3. The power train of the vehicle Ve shown in FIG. 22 also includes a first planetary gear unit (referred to as "PL1" in FIG. 22) 40, a second planetary gear unit (referred to as "PL2" in FIG. 22) 50, a first engagement device 60, a second engagement device 70 and an output unit 80 (referred to as "OUT" in FIG. 22).

Power of the engine 1 is distributed to the first motor 20 side and to the output unit 80 side through the first planetary gear unit 40 serving as a power distribution device. The first motor 2 and the second motor 3 are also connected individually to an electric power source 9 comprising a battery and an inverter or a converter (neither of which are shown) so that speeds and torques of the first motor 2 and the second motor 3 are controlled electrically. In addition, the first motor 2 and the second motor 3 may be selectively serve as motors and generators by controlling currents supplied thereto. Specifically, the second motor 3 may also be operated as a motor by supplying electricity generated by the first motor 2, and an output power of the second motor 3 may also be applied to the output unit 80.

The first planetary gear unit 40 is adapted to perform a differential action among a first input element 40a, a first reaction element 40b and a first output element 40c. Specifically, the first input element 40a is connected to the output shaft 1a of the engine 1, the first reaction element 40b is connected to the output shaft 2a of the first motor 2, and the first output element 4c is connected to the second input element 50a of the second planetary gear unit 50. The second planetary gear unit 50 is disposed on a downstream side of the first planetary gear unit 40 so that the engine torque is delivered to the second planetary gear unit 50 via the first planetary gear unit 40.

The second planetary gear unit 50 is also adapted to perform a differential action among a second input element 50a, a second reaction element 50b and a second output element 50c. Specifically, the second input element 50a is connected to the first output element 4c of the first planetary gear unit 40, the second reaction element 50b is connected to the first input element 40a of the first planetary gear unit 40 through the first engagement device 60, and the second output element 50c is connected to the output unit 80 that is connected to drive wheels (not shown) to transmit power thereto.

In the example shown in FIG. 1, the second engagement device 7 is arranged inside of the second planetary gear unit 5. However, in the example shown in FIG. 22, the second engagement device 70 is arranged outside of the second planetary gear unit 50 in such a manner as to selectively stop a rotation of the second reaction element 50b of the second planetary gear unit 50. A structure and a function of the first engagement device 60 are similar to those of the first engagement device 6 shown in FIG. 1.

Figures 23, 24:
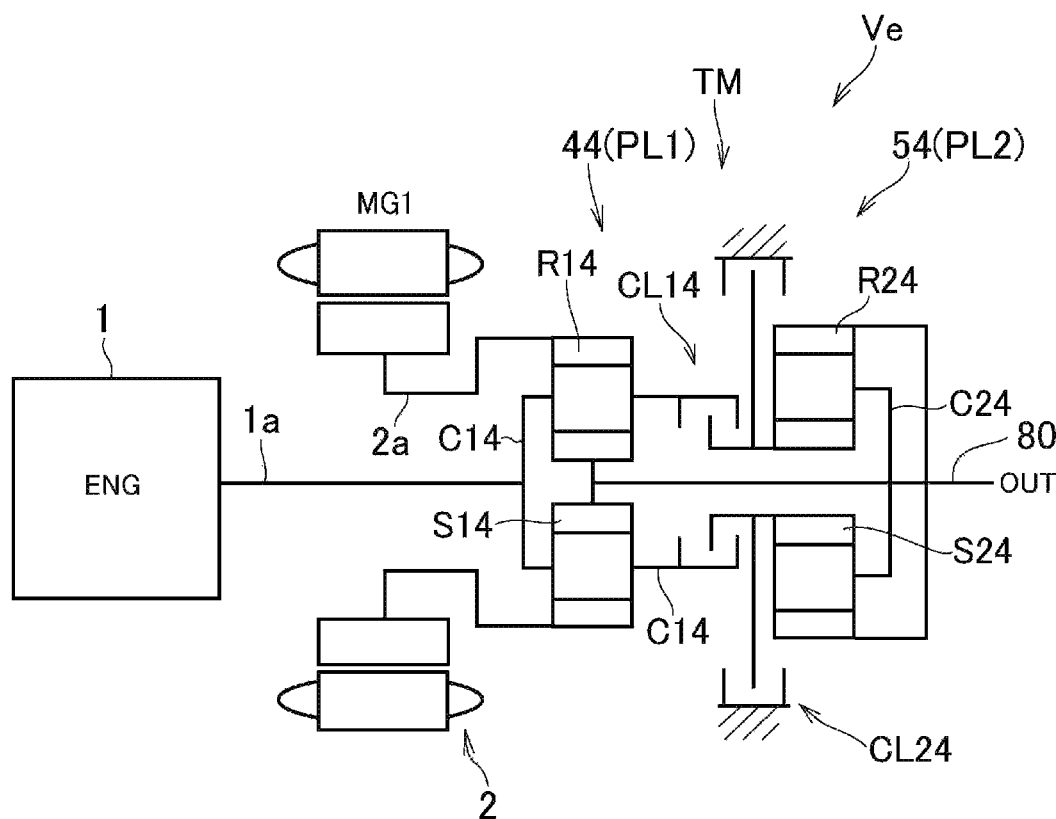
FIG. 23 is a schematic illustration showing a first example of a gear train of the hybrid vehicle shown in FIG. 22.
FIG. 24 is a table showing engagement states of engagement devices in the gear train shown in FIG. 23 in each operating mode.

Turning to FIG. 23, there is shown the first example of a gear train of the hybrid vehicle Ve shown in FIG. 22. According to the first example, the transmission TM comprises: a first single-pinion planetary gear unit (referred to as "PL1" in FIG. 23) 44 including a sun gear S14, a ring gear R14 and a carrier C14; a second single-pinion planetary gear unit (referred to as "PL2" in FIG. 23) 54 including a sun gear S24, a ring gear R24 and a carrier C24; a first clutch CL14 that selectively connects the carrier C14 to the sun gear S24; and a second clutch (or brake) CL24 that selectively stop a rotation of the sun gear S24. The carrier C14 is connected to the engine 1, the ring gear R13 is connected to the first motor 2, the sun gear S14 is connected to the carrier C24, and the ring gear R24 is connected to the output unit 80. Here, although not especially shown in FIG. 23, an output power of the second motor 3 may be delivered to the output unit 80.

As described, the gear trains shown in FIGS. 2, 18, 19 and 21 are adapted to be used as a transaxle in FF (front-engine/front-wheel drive) layout vehicles, RR (rear engine/rear wheel drive) layout vehicles, and MR (mid-engine/rear drive) layout vehicles. On the other hand, the gear train shown in FIG. 13 and a below-explained gear train shown in FIG. 25 are adapted to be used as a transaxle in FR (front engine/rear wheel drive) layout vehicles.

In the first planetary gear unit 44, accordingly, the carrier C14 serves as the first input element 40a, the ring gear R14 serves as the first reaction element 40b, and the sun gear S14 serves as the first output element 40c. On the other hand, in the second planetary gear unit 54, the carrier C24 serves as the second input element 50a, the sun gear S24 serves as the second reaction element 50b, and the ring gear R24 serves as the second output element 50c. Further, the first clutch CL14 serves as the first engagement device 60, and the second clutch CL24 serves as the second engagement device 70.

The operating modes available in the vehicle Ve shown in FIG. 23 are shown in FIG. 24. As shown in FIG. 24, the dual-motor mode of the EV mode, the high mode of the HV mode, and the low mode of the HV mode are also available in the vehicle Ve shown in FIG. 23. During propulsion in the dual motor mode of the EV mode, the operating mode may be shifted to the high mode of the HV mode by disengaging the second clutch CL24 while keeping the first clutch CL14 in engagement. By contrast, during propulsion in the dual motor mode of the EV mode, the operating mode may also be shifted to the low mode of the HV mode by disengaging the first clutch CL14 while keeping the second clutch CL24 in engagement. Accordingly, the routines shown in FIGS. 6 and 15 may also be executed in the vehicle Ve shown in FIG. 23.

Figures 25, 26:
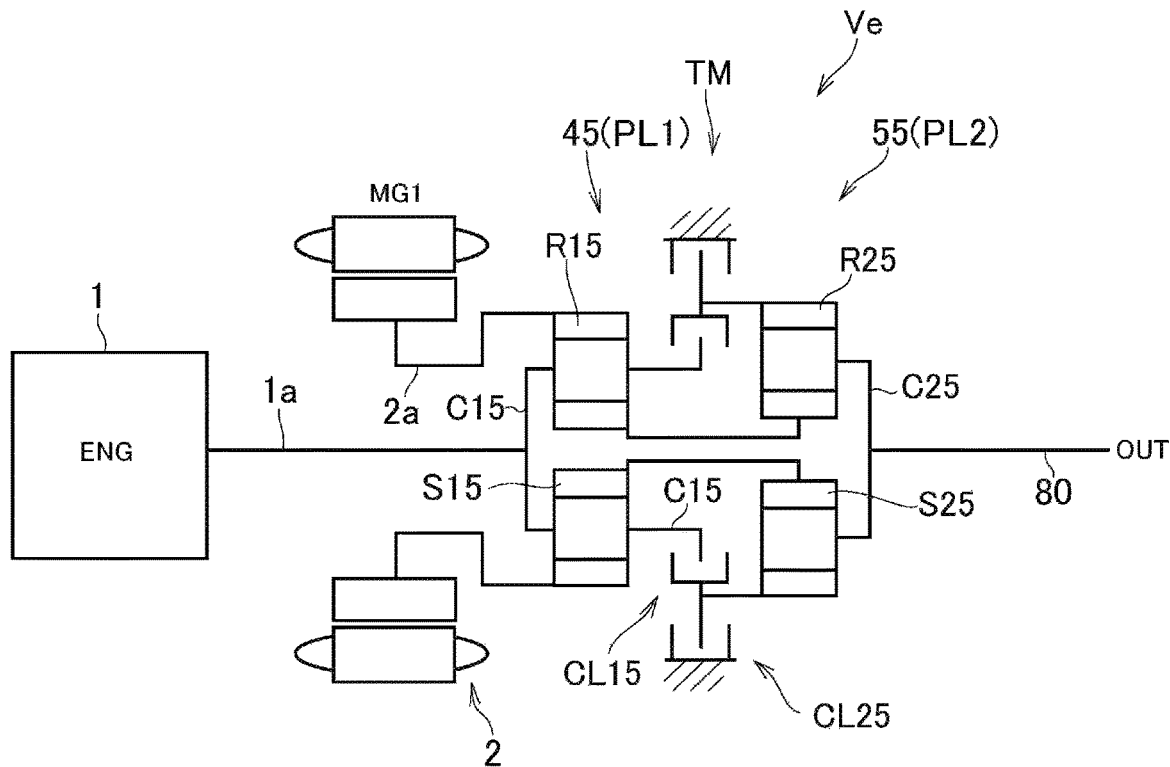
FIG. 25 is a schematic illustration showing a second example of a gear train of the hybrid vehicle shown in FIG. 22.
FIG. 26 is a table showing engagement states of engagement devices in the gear train shown in FIG. 25 in each operating mode

Turning to FIG. 25, there is shown the second example of a gear train of the hybrid vehicle Ve shown in FIG. 22. According to the second example, the transmission TM comprises: a first single-pinion planetary gear unit (referred to as "PL1" in FIG. 25) 45 including a sun gear S15, a ring gear R15 and a carrier C15; a second single-pinion planetary gear unit (referred to as "PL2" in FIG. 25) 55 including a sun gear S25, a ring gear R25 and a carrier C25; a first clutch CL15 that selectively connects the carrier C15 to the ring gear R25; and a second clutch (or brake) CL24 that selectively stop a rotation of the ring gear R25. The carrier C15 is connected to the engine 1, the ring gear R15 is connected to the first motor 2, the sun gear S15 is connected to the sun gear S25, and the carrier C25 is connected to the output unit 80. Here, although not especially shown in FIG. 25, an output power of the second motor 3 may be delivered to the output unit 80.

In the first planetary gear unit 45, accordingly, the carrier C15 serves as the first input element 40a, the ring gear R15 serves as the first reaction element 40b, and the sun gear S15 serves as the first output element 40c. On the other hand, in the second planetary gear unit 55, the sun gear S25 serves as the second input element 50a, the ring gear R25 serves as the second reaction element 50b, and the carrier C25 serves as the second output element 50c. Further, the first clutch CL15 serves as the first engagement device 60, and the second clutch CL25 serves as the second engagement device 70.

The operating modes available in the vehicle Ve shown in FIG. 25 are shown in FIG. 26. As shown in FIG. 26, the dual-motor mode of the EV mode, the high mode of the HV mode, and the low mode of the HV mode are also available in the vehicle Ve shown in FIG. 25. During propulsion in the dual motor mode of the EV mode, the operating mode may be shifted to the low mode of the HV mode by disengaging the second clutch CL25 while keeping the first clutch CL14 in engagement. By contrast, during propulsion in the dual motor mode of the EV mode, the operating mode may also be shifted to the high mode of the HV mode by disengaging the first clutch CL15 while keeping the second clutch CL25 in engagement. Accordingly, the routines shown in FIGS. 6 and 15 may also be executed in the vehicle Ve shown in FIG. 25.

Although the above exemplary embodiments of the present application have been described, it will be understood by those skilled in the art that the present application should not be limited to the described exemplary embodiments, and various changes and modifications can be made within the scope of the claims.

What is claimed is:

1. A control system for a hybrid vehicle, comprising:
   a transmission that is adapted to perform a differential action at least among an input element, a reaction element and an output element while distributing torque applied to the input element to the reaction element and the output element, and to change a ratio between a first torque delivered to the reaction element and a second torque delivered to the output element;
   an engine that is connected to the input element;
   a first motor having a generating function that is connected to the reaction element;
   a second motor that applies torque to an output unit connected to the output element; and
   a controller that controls the engine, the first motor, the second motor, and the transmission,
   wherein an operating mode can be selected from a hybrid mode in which the vehicle is powered by the engine, and an electric vehicle mode in which the vehicle is powered at least by the second motor, and wherein the controller is configured to:
   detect a speed of the vehicle;
   start the engine in a high mode in which a torque ratio of the output element to the input element is a predetermined value to shift the operating mode from the electric vehicle mode to the hybrid mode, if the vehicle speed is higher than a predetermined threshold speed;
   start the engine in a low mode in which said torque ratio is greater than that in the high mode to shift the operating mode from the electric vehicle mode to the hybrid mode, if the vehicle speed is lower than the predetermined threshold speed;
   calculate a required driving force of the vehicle; and
   start the engine in the high mode if the vehicle speed is lower than the predetermined threshold speed, and the required driving force is smaller than a predetermined threshold force.

2. The control system for a hybrid vehicle as claimed in claim 1, wherein the predetermined threshold speed is set between:
   a first vehicle speed at a point when the first motor serving as a generator starts serving as a motor in the process of starting the engine in the high mode; and a second vehicle speed at a point when the first motor serving as a generator starts serving as a motor in the process of starting the engine in the low mode.

3. The control system for a hybrid vehicle as claimed in claim 1, wherein the predetermined threshold force is increased with an increase in the vehicle speed.

4. The control system for a hybrid vehicle as claimed in claim 1, wherein the controller is further configured to:
   detect at least any one of an atmospheric temperature and a temperature of the engine; and
   start the engine in the low mode if the detected temperature is lower than a predetermined threshold temperature.

5. The control system for a hybrid vehicle as claimed in claim 1, wherein the transmission includes:
   a first planetary gear unit adapted to perform a differential action among a first input element, a first reaction element and a first output element;
   a second planetary gear unit adapted to perform a differential action among a second input element, a second reaction element and a second output element;
   a first engagement device that selectively connects the first input element to the second reaction element; and
   a second engagement device that selectively connects any two of rotary elements to rotate the second planetary gear unit integrally, wherein
   the first input element is connected to the engine, the first reaction element is connected to the first motor, the first output element is connected to the second input element, and the second output element is connected to the output unit.

6. The control system for a hybrid vehicle as claimed in claim 1, wherein the transmission includes:
   a first planetary gear unit adapted to perform a differential action among a first input element, a first reaction element and a first output element;
   a second planetary gear unit adapted to perform a differential action among a second input element, a second reaction element and a second output element;
   a first engagement device that selectively connects the first input element to the second reaction element; and
   a second engagement device that selectively stops a rotation of the second reaction element, wherein
   the first input element is connected to the engine, the first reaction element is connected to the first motor, the first output element is connected to the second input element, and the second output element is connected to the output unit.

7. The control system for a hybrid vehicle as claimed in claim 5, further comprising:
   a third engagement device that selectively stops a rotation of the first input element connected to the engine, wherein
   the controller is further configured to control the third engagement device.

* * * * *